United States Patent
Yamamoto et al.

(10) Patent No.: US 9,651,205 B2
(45) Date of Patent: May 16, 2017

(54) LIGHTING DEVICE WITH LIGHT SHIELDING PATTERN AND VIDEO DISPLAY DEVICE USING THE SAME

(75) Inventors: Shoji Yamamoto, Tokyo (JP); Satoshi Ouchi, Tokyo (JP); Junichi Yokoyama, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 185 days.

(21) Appl. No.: 14/416,337

(22) PCT Filed: Jul. 25, 2012

(86) PCT No.: PCT/JP2012/068752
§ 371 (c)(1),
(2), (4) Date: Feb. 13, 2015

(87) PCT Pub. No.: WO2014/016913
PCT Pub. Date: Jan. 30, 2014

(65) Prior Publication Data
US 2015/0176773 A1    Jun. 25, 2015

(51) Int. Cl.
*G09F 13/04* (2006.01)
*F21K 99/00* (2016.01)
(Continued)

(52) U.S. Cl.
CPC .............. *F21K 9/50* (2013.01); *F21V 3/0472* (2013.01); *F21V 9/16* (2013.01); *F21V 13/02* (2013.01);
(Continued)

(58) Field of Classification Search
CPC . F21K 9/50; F21V 3/0472; F21V 9/16; F21V 13/02; F21V 5/02; G02F 1/133606;
(Continued)

(56) References Cited

U.S. PATENT DOCUMENTS 8,491,144 B2    7/2013  Nakamura et al.
2008/0291359 A1  11/2008  Miyashita
(Continued)

FOREIGN PATENT DOCUMENTS

JP    2008-241936    10/2008
JP    2008-281647    11/2008
(Continued)

OTHER PUBLICATIONS

International Search Report in PCT/JP2012/068752, dated Nov. 6, 2012.
(Continued)

*Primary Examiner* — Andrew Coughlin
*Assistant Examiner* — Hana Featherly
(74) *Attorney, Agent, or Firm* — Mattingly & Malur, PC

(57) ABSTRACT

A lighting device has a reflection sheet; an LED having an optical element arranged at a predetermined distant position away from the reflection sheet and being used for emitting light in a direction in parallel with a light emitting surface of the lighting device in a space between the reflection sheet and the optical element; and an optical sheet provided on the light emitting surface side of the optical element. A light shielding pattern is provided at a position corresponding to the LED on the light emitting surface side of the optical element, and the light shielding pattern is configured by stacking a plurality of light shielding layers in which the light shielding layer positioned closest to the optical element side is made of a white ink, and in which at least one of the other light shielding layers is made of a mixed color ink.

19 Claims, 16 Drawing Sheets

(51) Int. Cl.
*F21V 3/04* (2006.01)
*F21V 9/16* (2006.01)
*F21V 13/02* (2006.01)
*F21V 5/02* (2006.01)
*G02F 1/1335* (2006.01)
*F21Y 101/00* (2016.01)
*F21Y 105/10* (2016.01)
*F21Y 115/10* (2016.01)

(52) U.S. Cl.
CPC .. *G02F 1/133606* (2013.01); *G02F 1/133611* (2013.01); *F21V 5/02* (2013.01); *F21Y 2101/00* (2013.01); *F21Y 2105/10* (2016.08); *F21Y 2115/10* (2016.08); *G02F 1/133603* (2013.01)

(58) Field of Classification Search
CPC ......... G02F 1/133611; G02F 1/133603; F21Y 2101/00; F21Y 2105/10; F21Y 2115/10
USPC ....................................................... 362/97.3
See application file for complete search history.

(56) References Cited

U.S. PATENT DOCUMENTS

| | | | | |
|---|---|---|---|---|
| 2011/0242794 | A1* | 10/2011 | Nakamura | G02F 1/133615 362/97.1 |
| 2011/0299044 | A1* | 12/2011 | Yeh | G03B 21/005 353/52 |

FOREIGN PATENT DOCUMENTS

| | | |
|---|---|---|
| JP | 2009-110696 | 5/2009 |
| JP | 2009-187904 | 8/2009 |
| JP | 2011-216322 A | 10/2011 |
| JP | 2012-008280 | 1/2012 |
| JP | 2012-128016 A | 7/2012 |
| WO | 2011/025174 A2 | 3/2011 |
| WO | 2012/086896 A1 | 6/2012 |

OTHER PUBLICATIONS

Japanese Office Action received in corresponding Japanese Application No. 2014-526649 dated Aug. 18, 2015.

* cited by examiner

LIGHTING DEVICE WITH LIGHT SHIELDING PATTERN AND VIDEO DISPLAY DEVICE USING THE SAME

TECHNICAL FIELD

The present invention relates to a lighting device and to a video display device using this lighting device as a backlight device, and, more particularly, the present invention relates to a lighting device using an LED (Light Emitting Diode) as a light source and to a video display device using this lighting device.

BACKGROUND ART

In a video display device (liquid crystal display device) using a liquid crystal panel as a display device, various devisal for improving an average luminance and spatial luminance uniformity within a light emitting surface of a backlight for emitting light to the liquid crystal panel have been conventionally proposed in order to achieve high quality of a displayed image.

For example, Patent Document 1 has described that the luminance and luminance uniformity of the light to be emitted to the liquid crystal panel can be increased by arranging an optical element formed of two layers of a transparent layer on a light-source side and a diffusion layer on a liquid-crystal panel side between the light source (fluorescent tube, light emitting diode) and the liquid crystal panel, and providing a plurality of light shielding layers on a surface of or inside the transparent layer.

PRIOR ART DOCUMENT

Patent Document

Patent Document 1: Japanese Patent Application Laid-Open Publication No. 2012-8280

SUMMARY OF THE INVENTION

Problems to be Solved by the Invention

The light emitting diode (LED) that is generally used as a light source of a backlight device emits light having a desired wavelength by exciting a phosphor.

When the LED having such a configuration is used in the above-described Patent Document 1, the light emitted from the LED is reflected on a surface of the light shielding layer, and is made incident again onto the phosphor of the LED. The phosphor of the LED is excited again by this incident light. By the light generated by the re-excitation of the phosphor, the wavelength characteristics of light in the vicinity of the LED, particularly, in a portion right above the LED (opposed to the optical element), are changed, so that the chromaticity in a portion right above the LED is changed. Therefore, in a case of a configuration in which the LED is arranged within an effective display region of the display device, there is a problem that the portion right above the LED is recognized as color unevenness. The above-described Patent Document 1 has not considered such color unevenness.

The present invention is to provide a suitable technique for reducing the color unevenness while improving the utilization efficiency of light.

Means for Solving the Problems

The present invention has features including an LED serving as a light source and an optical element for guiding or diffusing light from the LED, providing a light shielding pattern at a position corresponding to the LED of the optical element, configuring the light shielding pattern by at least two or more layers of light shielding layers, configuring the light shielding layer on the optical element side of the light shielding layers by white ink, and configuring at least one of the other light shielding layers by, for example, mixed ink of white and blue or a mixed ink of white, blue, and black.

Moreover, in order to further improve the luminance unevenness, a prism may be provided on the LED side of the optical element.

Effects of the Invention

According to the present invention, the color unevenness can be suppressed while improving utilization efficiency of light.

BRIEF DESCRIPTIONS OF THE DRAWINGS

BEST MODE FOR CARRYING OUT THE INVENTION

Hereinafter, one embodiment of the present invention will be described in detail with reference to the accompanying drawings. Note that the following explanation will be made for explaining one embodiment of the present invention, and does not limit the scope of the present invention. Therefore, those who skilled in the art can apply an embodiment in which each component or all the components are replaced by a component(s) equivalent to the component(s), and these embodiments are included within the scope of the present invention.

Note that, in the following explanation of the embodiments, components having the same function/configuration are denoted by the same reference symbols throughout each drawing, and the repetitive description thereof will be omitted.

First Embodiment

Figure 1:
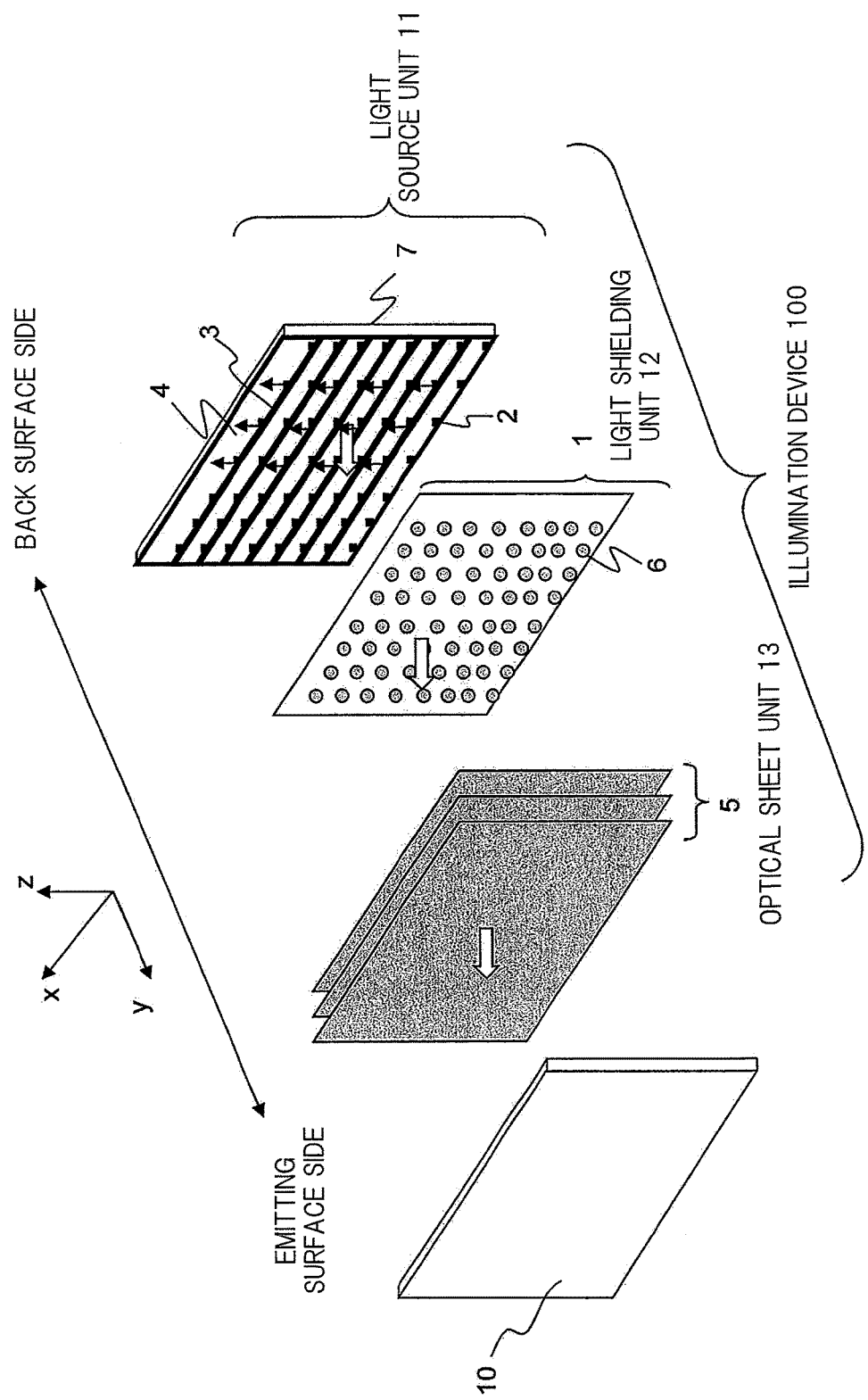
FIG. 1 is an exploded perspective view of a video display device and a lighting device used for the video display device, according to a first embodiment of the present invention.

FIG. 1 shows a developed perspective view showing a video display device and a lighting device according to a first embodiment of the present invention. The video display device of FIG. 1 is provided with a liquid crystal panel 10 serving as a display panel and a lighting device 100, and the lighting device is provided with a light source unit 11, a light shielding unit 12 and an optical sheet unit 13. The lighting device 100 is operated as a backlight for irradiating the liquid crystal panel 10 with light from the back surface of the liquid crystal panel 10. On the liquid crystal panel 10, light transmittance of each liquid crystal pixel is controlled by an input video signal, and light from the lighting device is spatially modulated in each liquid crystal pixel whose light transmittance has been controlled, so that video images are displayed thereon.

In the lighting device 100 according to the present embodiment, a light emitting diode (LED) for emitting white light is used as its light source. This white color diode has a configuration having, for example, yellow phosphor and an LED chip for emitting blue light for emitting white light by exciting the yellow phosphor by a part of the blue light from the LED chip, emitting light, and mixing yellow light from the yellow phosphor and the blue light from the LED chip. The LED to be applied to the present embodiment is not limited to have this configuration but may have any configuration as long as the LED emits light of a desired color by utilizing a phosphor.

Hereinafter, each component of the lighting device 100 will be described. However, prior to the description, each direction in FIG. 1 is defined as follows. A light emitting direction of the lighting device 100 is defined as a light emitting surface side of the lighting device 100, and an opposite direction to this direction is defined as a back surface side of the lighting device 100. Note that the light emitting surface of the lighting device 100 is defined as a front surface (light emitting surface) of each of various sheets forming the optical sheet unit 13. Moreover, an upward direction of the liquid crystal panel 10 or the lighting device 100 from which light of the LED2 is emitted is defined as a "+z" direction, and an opposite direction to this direction (that is, a downward direction of the liquid crystal panel 10 or the lighting device 100) is defined as a "−z" direction, a direction which goes from the back surface side (light source unit side) toward the light emitting side (optical sheet unit side) and which is also orthogonal to the "z" direction is defined as a "+y" direction; and an opposite direction to this direction (that is, a direction going from the light emitting surface side toward the back surface side) is defined as a "−y" direction. That is, the y direction is equal to the direction orthogonal to the light emitting surface of the lighting device 100, and the +y direction is referred to as a light emitting surface side direction, and the −y direction is referred to as a back surface side direction in some cases. Moreover, a direction which is orthogonal to a "yx" plane and which is a leftward direction when viewed from the light emitting surface side of the lighting device 100 is defined as a "+x" direction, and an opposite direction to this direction is defined as a "−x" direction. Hereinafter, the present embodiment will be explained by using this coordinate system, unless otherwise specified. Note that, when simply described as "light emitting surface side", this indicates the light emitting surface side of the lighting device 100.

The light source unit 11 includes: an LED 2 serving as a light source, an LED substrate 3 serving as a light source substrate on which a plurality of the LEDs 2 are mounted; a reflection sheet 4; and a base chassis 7. As the LED 2, a white LED of a side-view type whose light emitting direction is in parallel with an electrode surface is used in the present embodiment, and is mounted on the LED substrate 3 so as to emit white light in the +z direction. That is, the light emitting direction of the LED is a direction in parallel with the light emitting surface of the lighting device, and, at the same time, is an upward direction of the orthogonal direction to the liquid crystal panel 10 or the lighting device 100 (a short-length direction or a longitudinal direction, which is an upward direction on a sheet of FIG. 1).

The LED substrate 3 includes a circuit element and a wiring for supplying power to the LED 2, and is a printed board made of, for example, a glass epoxy resin. Moreover, the LED substrate 3 has a laterally-elongated rectangular shape which extends in the x direction. That is, a longitudinal direction of the LED substrate 3 is equal to a horizontal direction of the liquid crystal panel 10 or the lighting device 100 (longitudinal direction or lateral direction, which is a right-and-left direction on a sheet of FIG. 1). A plurality of the LEDs 2 are arranged in one row along the longitudinal direction of the LED substrate 3. When the plurality of LEDs arranged in one row is assumed as an LED row, the LED substrate 3 can be also referred to as being formed so as to correspond to each of the LED rows. Moreover, an electric current to be supplied to each LED 2 is controlled by various circuits mounted on the LED substrate 3.

The base chassis 7 is made of metal having a high thermal conductivity, such aluminum or iron, and has a "masu (in Japanese)" (measuring box) shape or a box shape which is opened on the liquid crystal panel 10 side. Moreover, a plurality of the LED substrates 3 each having an inner surface (the light emitting side) with the plurality of LEDs 2 arranged thereon are arranged so as to have a predetermined interval in the z direction, and are fixed. In this manner, the plurality of LED rows are arranged along the light emitting direction (z direction) of the LED 2.

The reflection sheet 4 is used for directing the light traveling toward the back surface side to the light emitting surface side, and configured of, for example, a white plate-shaped resin sheet. The reflection sheet 4 is attached to an inner surface (light emitting surface side) of the base chassis 7 so as to be positioned closer to the back surface side than the LED 2. For example, the base chassis 7 is attached so as to, for example, sandwich the reflection sheet 4 by the base chassis 7 and the LED substrate 3. At this time, the front surface (surface on the light emitting surface side) of the LED substrate 3 is subjected to a reflection coating such as a white coating in order to enhance the reflection efficiency. Moreover, the LED substrate 3 is attached to the base chassis 7, a reflection sheet 4 provided with a hole corresponding to the LED 2 is covered above them, and the reflection sheet 4 may be attached to the base chassis 7 in a state in which the LED 2 is exposed on the hole of the reflection sheet 4. In this case, the front surface of the LED substrate 3 is covered with the reflection sheet 4, and therefore, the reflection coating onto the surface of the LED substrate 3 is unnecessary. However, it is preferred to form a step difference portion or a bent portion also on the reflection sheet 4 so as to correspond to a step difference between the LED substrate 3 and the base chassis 7. Moreover, the reflection sheet 4 may be individually provided on each of the inner surface (light emitting surface side) of the base chassis 7 and the front surface of the LED substrate 3.

The light shielding unit 12 contains the optical element 1 and the ink 6 serving as a light shielding pattern. The optical element 1 is a diffusion plate (hereinafter, this diffusion plate is referred to as "light-shielding-unit diffusion plate") that is formed by mixing light diffusing particles or beads with a transparent resin such acrylic resin, polycarbonate, or polystyrene or by performing a surface roughening treatment on the light emitting surface or the back surface or both of the surfaces of a transparent resin. In this manner, the spatial light luminance uniformity on the light emitting side can be improved. Moreover, the ink 6 serving as the light shielding pattern has an optical function for reflecting or absorbing the light traveling toward the +y direction from the LED 2 so as to reduce the luminance of the light traveling toward the +y direction.

The optical sheet unit 13 is configured of one or a plurality of optical sheets 5. This optical sheet 5 is configured of one of a diffusion plate, a diffusion sheet, a μ-lens sheet, a prism sheet having a light-converging effect and a luminance improving sheet that transmits predetermined polarization light while reflecting polarization components except for the polarization light, or configured of any combination of them. By using this optical sheet 5, light from the light shielding unit 12 is diffused and/or a component of the light traveling toward the light emitting surface side is increased, so that the spatial luminance uniformity and luminance on the light emitting side can be improved.

Here, the explanation will be further made for the ink 6 serving as the light shielding pattern in the light shielding unit 12. As described above, the LED 2 emits light in the +z direction on the side view-type LED, and the light is leaked upward (in the +y direction) from the package of the LED 2, and besides, the emitted light from the LED 2 is directed toward the +y direction by the reflection sheet 4 which is the closest to the light emitting side of the LED 2. Therefore, a so-called light spot (hot spot) is caused, the light spot being a portion in vicinity of a position of the LED 2 which is locally brighter than other position when viewed from the light emitting surface side of the lighting device 100. By a user, the hot spot is visually recognized as luminance unevenness. In order to prevent the luminance unevenness, by using the ink 6 serving as the light shielding pattern, the light quantity in the vicinity of the position of the LED 2 is reduced on the light emitting surface of the optical element 1 so that the brightness of the hot spot is reduced.

For this reason, the ink 6 is provided on positions corresponding to arrangement positions of the optical element (light-shielding-unit dispersion plate) 1 and the LED 2 and the peripheral positions (more particularly, on the light emitting side of the LED 2) thereof. The ink 6 is provided on the light emitting surface side (that is, the optical sheet unit 13 side) of the optical element 1 in the present embodiment. However, the ink may be provided on the back surface side (that is, the light source unit 11 side) of the optical element 1, or on both of the sides.

Figure 2:
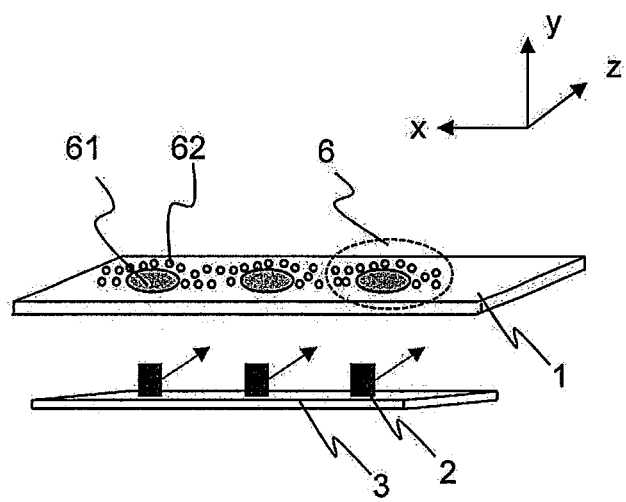
FIG. 2 is an enlarged perspective view of a part of the lighting device when seen from a "−z" direction side.

Details of the configuration of the ink 6 will be described with reference to FIGS. 2 and 3. FIG. 2 is an enlarged perspective view showing the LED 2 and the LED substrate 3 of the light source unit 11, and besides, a portion containing an optical unit agent 1 and the ink 6 serving as the light shielding pattern of the light shielding unit 12, when viewed from the −z direction side. Moreover, FIG. 3 is a front view showing the light-shielding-unit diffusion plate 1 of the light shielding unit 12 and a portion containing the ink 6 serving as the light shielding pattern when viewed in the +y direction (light emitting surface side), and is a view showing one example of the printed pattern of the ink 6.

The ink 6 serving as the light shielding pattern in the present embodiment includes: a first pattern 61 having an oval or elliptical shape whose longitudinal direction is the x direction and which has such a size as to cover the entire one LED 2 from the light emitting surface side; and a second pattern 62 having a fine dot which is arranged on the LED 2 on the light emitting direction side in the periphery of the first pattern 61.

Figure 3:
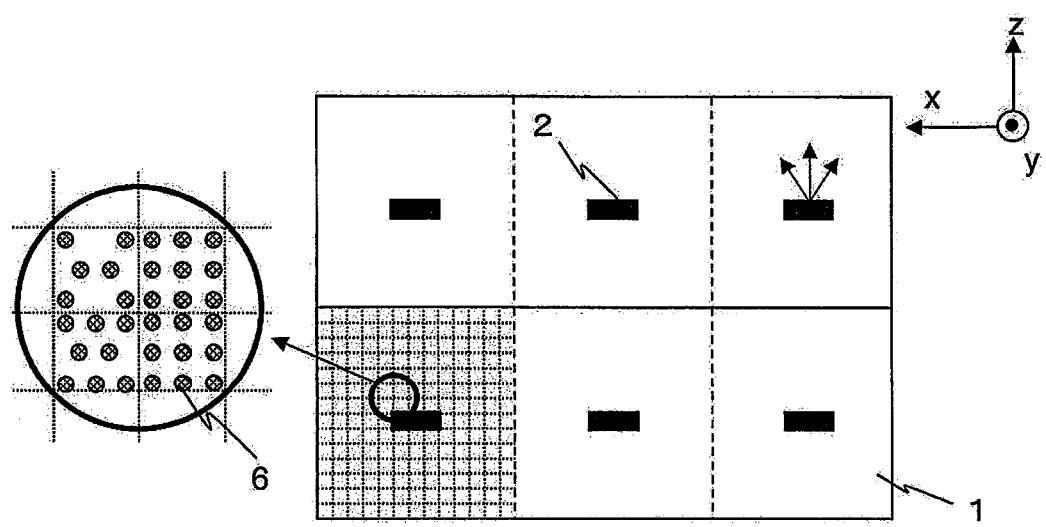
FIG. 3 is a view showing one example of ink 6 when seen from a "+y" direction (light emitting surface side)

Such a light shielding pattern is formed as, for example, shown in FIG. 3. In the enlarged view of the optical element 1 shown on the right side of FIG. 3, a plurality of fine squares shown in a left-and-down end region indicate virtual unit blocks. A density of the dot-shaped ink 6 in this unit block is changed depending on a position of the unit block as shown in, for example, an enlarged view of four unit blocks on the left side of FIG. 3. In the unit block in which the first pattern 61 is formed, a ratio (density) occupied by the ink 6 is 100% (that is, the unit block is solidly painted with the ink 6). A ratio (density) occupied by the ink 6 in a unit block in which the second pattern 62 is formed is changed depending on a distance from the first pattern 61 within a range from 80 to 10%. For example, as the distance from the first pattern 61 becomes larger or as it is farther separated therefrom, the density of the ink 6 in the unit block in which the second pattern 62 is formed is gradually made to be lower.

In this manner, a light shielding pattern having such a characteristic as to have the lowest light transmittance at a portion corresponding to the LED 2, and also as to gradually increase the light transmittance as separating further from the LED 2 in the light emitting direction of the LED 2 can be obtained. The light intensity of the above-described hot spot has such a characteristic as to be gradually decreased as further separating from the LED 2. Therefore, by configuring the light transmittance characteristics of the light shielding pattern so as to be matched with the characteristics of the hot spot as described above, the brightness of the hot spot can be favorably reduced. Note that the above-described unit block is virtual, and does not appear on the optical element 1. Furthermore, a size of the unit block and a size of the dot of the ink 6 can be appropriately changed depending on the combination of the optical configuration of the light source unit 11, the light emitting characteristics of the LED 2, the distance from the optical element 1 to the optical sheet unit 5, and the optical sheet.

In the lighting device having such a configuration, the present embodiment has the feature that the ink 6 serving as the light shielding pattern has a multi-layered structure obtained by stacking a plurality of light shielding layers (ink layers). The feature of the present embodiment will be described with reference to FIGS. 4 to 7.

Figure 4:
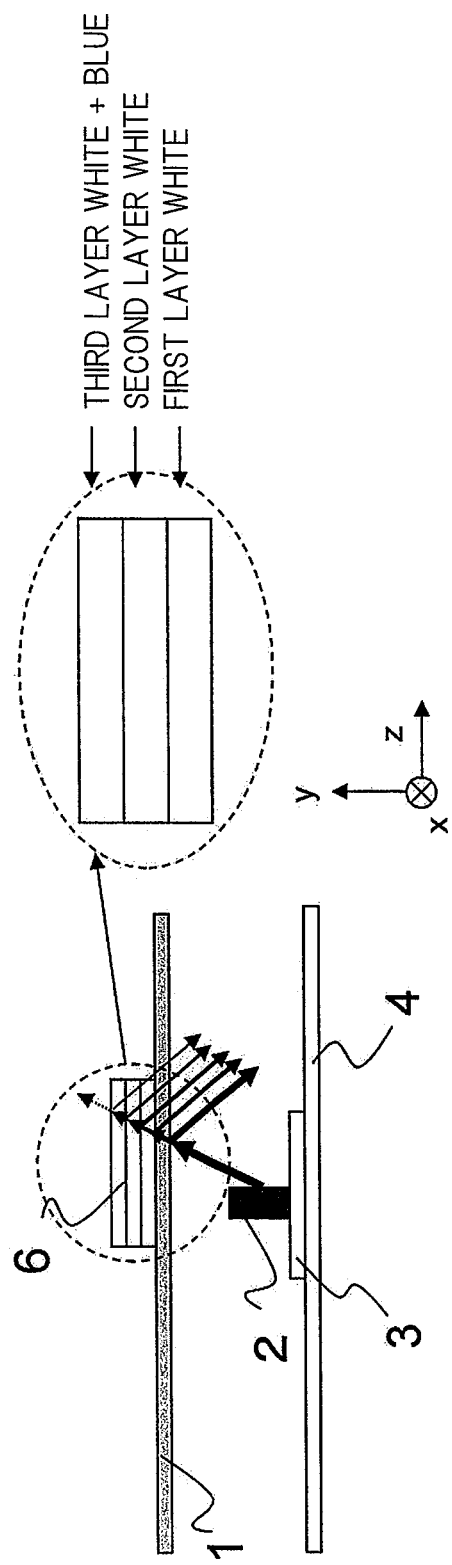
FIG. 4 is a view showing one example of a configuration of the ink 6 according to the first embodiment.

FIG. 4 is a cross-sectional view in parallel with a "y-z" plane showing the stacked structure of the ink 6 serving as the light shielding pattern, more particularly, the first pattern of the first embodiment. In FIG. 4, the LED substrate 3 is arranged on the reflection sheet 4, and, for example, a white paint is applied onto the surface of the LED substrate 3. As described above, the configuration of the reflection sheet 4 is not limited to this. The optical element 1 (light-shielding-unit diffusion plate) is arranged with a predetermined distance in the +y direction so as to be opposed to the reflection surface of the reflection sheet 4 or the surface of the LED substrate 3. Therefore, between the reflection sheet 4 and the optical element 1, a space having the predetermined distance is formed. The LED 2 is arranged in this space, and the LED 2 emits light toward the +z direction in this space. That is, the optical axis of the LED 2 is in parallel with the surface of the reflection sheet 4 or the optical element 1 and with the z direction. The light emitted with a predetermined light emitting angle from the LED 2 in the +z direction is repeatedly reflected between the reflection sheet 4 and the optical element 1, and propagates in the +z direction in the space while the light is partially transmitted through the optical element 1. FIG. 4 illustrates only the light from the LED which directly travels toward the optical element 1 by using an arrow.

The light that directly travels from the LED toward the optical element 1 is partially reflected on a boundary surface between the optical element 1 and the ink 6 and on a boundary between the layers of the multi-layered ink 6, and returned toward the LED 2 side. In this case, the ink 6 has a structure of three layers which are defined as a first layer, a second layer and a third layer in an order from the optical element 1 side or the LED 2 side toward the optical sheet 5 side. Here, as the colors of the respective layers of the ink 6, the first layer has a white color, the second layer also has a white color, and the third layer has a mixed color of white and blue. In other words, the layer (first layer) positioned so as to be closest to the optical element side has a higher ratio of the white color (white purity) than a ratio of at least one of the other layers. In the present embodiment, the ratio of the white color in the first layer is 100%, that is, the first layer is made of only the white ink without mixing the other color therewith. However, the ratio is not always required to be 100%. For example, other color such as blue or black may be mixed therewith at a ratio smaller than a mixed ratio of blue ink or black ink in a mixed ink described later. Hereinafter, an optical function of each of the light shielding layers will be explained.

First, the optical function of the white ink of the first layer will be explained. Here, a case that the ink 6 having a high absorptivity is used will be considered. As one example, it is assumed that the transmittance of the optical element 1 is 80%, that the transmittance and the absorptivity of each of the ink layers are 30% and 10%, respectively, that a dimension of the ink 6 extending in the +z direction from the light emitting side of the LED 2 is 10 mm, and that a distance in the +y direction between the center of the light emitting surface of the LED 2 and the optical element 1 is 3.4 mm. In such a configuration, if light of 27.1% of the entire light quantity is light that directly impacts on the ink surface of the first layer, and if light of 10% of the light of 27.1% is absorbed by the first layer, light of 2.7% becomes a loss. Moreover, the loss of the light is further increased also in consideration of light which is reflected on the first layer of the ink 6, which is again reflected on the reflection sheet 4, and then, which impacts again on the ink 6. In consideration of the loss of the light due to the absorption, it is required to use an ink having a low absorptivity, and therefore, it is effective to use a white ink having low absorption as the ink 6. In general, ink containing a color tone such as blue ink or black ink has a high absorptivity. For this reason, in the present embodiment, the absorbed light quantity is suppressed to the minimum by using the white ink, so that the light quantity reflected on the first layer, and propagated in the z direction is increased. In this manner, the efficiency of light usage can be improved.

The ink of the second layer is similarly made of white ink in order to suppress the absorption relative to the transmitted light (8.1% of the entire light quantity) from the first layer.

As described above, the ink of the first layer and the ink of the second layer have a function for improving the utilization efficiency of light.

Subsequently, an optical function of the ink of the third layer will be described. However, prior to the description, an optical influence caused by the reflected light from the ink 6 and chromaticity change of the light transmitted from the ink 6 will be described with reference to FIGS. 5 and 6.

Figure 5:
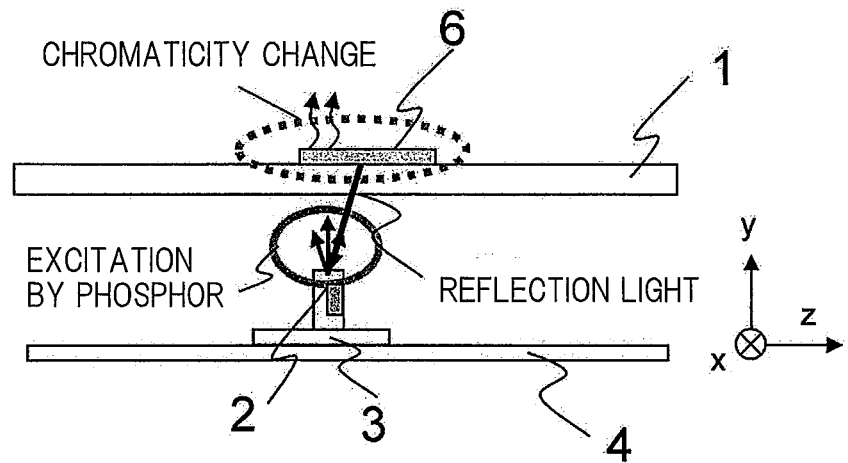
FIG. 5 is a view for explaining optical influences in the ink 6 due to reflected light.

FIG. 5 shows the optical influence caused by the reflected light from the ink 6. As shown in the diagram, the light reflected from the ink 6 is partially made incident to the LED 2, and the phosphor of the LED 2 is again excited by this incident light. At this time, by the color of the phosphor of the LED 2, the chromaticity of light (hot spot) right above the LED is changed. In the present embodiment, since a white LED having a yellow phosphor is used as the LED 2, light generated by the re-excitation of the yellow phosphor contains strongly yellow- to red-color tone components. Therefore, the chromaticity of the light (hot spot) right above the LED changes in a direction to yellow to red color.

Figure 6:
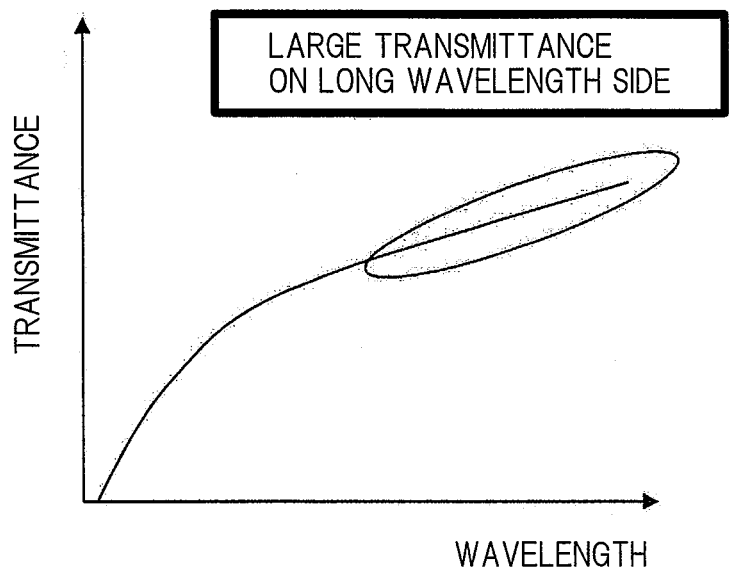
FIG. 6 is a view showing a general wavelength-transmittance property of white ink.

Meanwhile, the light transmitted through the first layer and the second layer of the ink 6 is also changed in the chromaticity by the optical property of the ink 6. As shown in FIG. 6, a general-use white ink has such a wavelength-transmittance property (transmission spectrum) as to have a high transmittance on the long wavelength side. For this reason, light in the vicinity of the LED 2 particularly having the intense light quantity is changed in the chromaticity in the direction to the yellow- to red-color more than that on the periphery thereof.

In this manner, the light right above the LED 2 is largely shifted toward the long wavelength side or changed in the chromaticity by adding the chromaticity change in the yellow to red color direction caused by the re-excitation of the phosphor of the LED 2 with the chromaticity change of the transmitted light caused by the optical property of the white ink, with the result that the chromaticity is greatly shifted or changed. When such chromaticity change occurs, color unevenness locally occurs right above the LED 2, and degradation in the spatial color uniformity within the light emitting surface of the lighting device 100 occurs. That is, the hot spot caused in the vicinity of the portion right above the LED 2 is locally higher in the luminance than the periphery thereof, and besides, is locally different in the color more than the periphery thereof, and therefore, contains particularly the strong yellow-color tone or red-color tone component.

Figure 7:
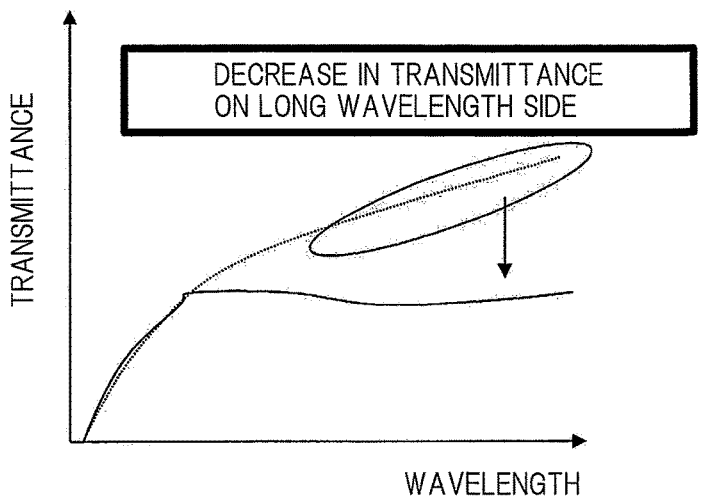
FIG. 7 is a view showing a wavelength-transmittance property of a blue mixed ink obtained by mixing white color and blue color.

In the present embodiment, in order to reduce such degradation in the color uniformity, ink obtained by mixing white and blue colors (hereinafter, referred to as "blue mixed ink") is used for the third layer of the ink 6 as shown in FIG. 4. As shown in FIG. 7, the blue mixed ink has such a wavelength-transmittance (transmission spectrum) property as to absorb more light on the long wavelength side without absorbing light of the blue wavelength band on the short wavelength side. Therefore, in the light that has transmitted through the first layer and the second layer in the vicinity of the portion right above the LED 2 having the strong yellow- or red-color tone component, the yellow- or red-color tone component of the transmitted light is absorbed in the third layer by using the blue mixed ink for the third layer of the ink 6. That is, the light having the strong yellow or red tone that has transmitted through the first layer and the second layer is corrected by the third layer so as to be returned to white. The amount of the chromaticity adjustment in the third layer can be set by, for example, changing a composition amount of the blue ink in the blue mixed ink with taking the chromaticity of the emitted light of the lighting device as a target chromaticity. In the blue mixed ink according to the present embodiment, a mixed ratio of the blue ink with respect to the white ink is set in, for example, a range of about 0.1 to 0.4% in weight ratio.

In this manner, the blue mixed ink of the third layer has a function for adjusting or correcting the chromaticity of light on the portion right above the LED 2.

As described above, according to the present embodiment, the ink 6 serving as the light shielding pattern formed on the optical element has the multi-layered structure obtained by stacking the plurality of light shielding layers, and the light shielding layer (first layer in the present embodiment) positioned so as to be the closest to the back surface side (LED 2 side) is made of the white ink, and at least one (third layer in the present embodiment) of the other light shielding layers is made of the blue mixed ink, and therefore, the chromaticity change due to the phosphor of the LED 2 and the white ink in the first layer can be reduced while reducing the light intensity of the hot spot in the vicinity of the portion right above the LED 2. Therefore, according to the present embodiment, a lighting device with the improved spatial luminance uniformity and color uniformity of the emitted light can be provided. Moreover, by using the lighting device according to the present embodiment as a backlight of a liquid crystal display device, high quality images with the high spatial luminance uniformity and color uniformity can be displayed.

The brightness of the hot spot can be further reduced as the thickness of the light shielding pattern becomes thicker. For this reason, in the present embodiment, in order to ensure the thickness of the light shielding pattern, the light shielding pattern is formed so as to have the three-layered structure. However, the structure is not limited to this. If the film thickness of each layer can be made thicker, the structure may be achieved by two layers. Of course, it is also needless to say that the structure is a four-layered structure. Moreover, in the above-described embodiment, the first pattern 61 has been explained. However, it is clear that the second pattern 62 may similarly have the multi-layered structure. Furthermore, the first pattern 61 may have the multi-layered structure, and the second pattern 62 may have a one-layer structure.

Second Embodiment

Figure 8:
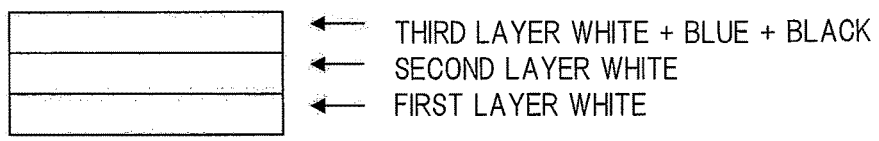
FIG. 8 is a view showing a configuration of an ink 6 according to a second embodiment of the present invention.

With reference to FIG. 8, a second embodiment of the present invention will be explained. Since the present embodiment is different from the first embodiment only in the composition of the ink in the third layer, explanation except for those of the ink in the third layer will be omitted.

As shown in FIG. 8, in the ink 6 according to the present embodiment, the third layer is made of an ink obtained by mixing white, blue and black colors (hereinafter, referred to as "blue and black mixed ink"). By this ink, the hot spot is favorably reduced in the less printing processes.

In order to suppress the hot spot right above the LED 2, it is required to provide a film thickness of about 16 μm for the light shielding pattern. However, in order to reproduce a fine pattern by a printing process, it is required to decrease a mesh number of the printing plate. However, the decrease in the mesh number of the printing plate means that the film thickness formed by the printing process at one time becomes thinner. Practically, when it is desired to form a dot having a size of 0.47 μm, it is required to use a printing plate having the mesh number of "350×350". The film thickness formed by the printing process at one time in such a printing plate is about 4 μm to 5 μm. Therefore, in order to obtain a film thickness of 16 μm, it is required to perform the printing process 3 to 4 times. The increase in the number of printing processes increases a printing cost. For this reason, in order to achieve both of the fine pattern and the decrease in the number of printing processes, a new devisal for suppressing the hot spot is required.

Therefore, in the present embodiment, by using the blue and black mixed ink as the ink of the third layer, the light absorptivity in the third layer is increased. In this manner, the light can be further absorbed while correcting the chromaticity of light transmitted through the first layer and the second layer, so that the chromaticity change can be suppressed while reducing the light intensity of the hot spot even in a thin film thickness of the light shielding pattern. In the blue and black mixed ink according to the present embodiment, the mixed ratios of the blue ink and the black ink with respect to the white ink are set to, for example, about 0.1 to 0.4% in the weight ratio, respectively.

When the blue and black mixed ink is used for the first layer, the light utilization efficiency is reduced since the light quantity absorbed in the first layer increases so that the light is reflected on the first layer, which results in decrease in the light quantity propagating in the z-direction. However, in the present embodiment, the blue and black mixed ink is used for the third layer, and therefore, the decrease in the light quantity propagating in the z direction can be suppressed. That is, according to the present embodiment, the further reduction of the light intensity of the hot spot while suppressing the chromaticity change of the light in the vicinity of the portion right above the LED 2 can be achieved in the light shielding pattern having the thin film thickness (that is, in the less number of printing processes).

As similar to the first embodiment, also in the present second embodiment, the light shielding pattern may have the two-layered structure or the four-layered structure.

Third Embodiment

Figure 9:
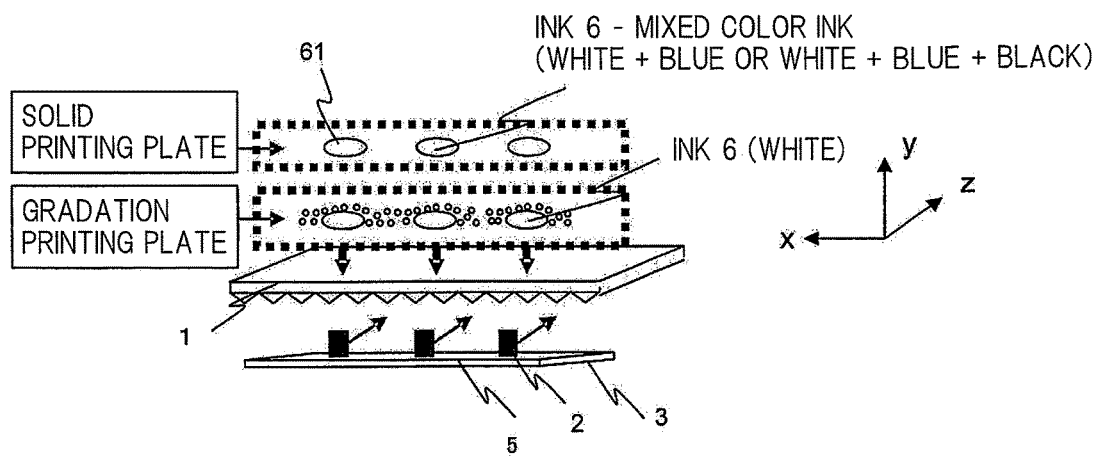
FIG. 9 is a view showing a method of forming an ink 6 according to a third embodiment of the present invention.

With reference to FIG. 9, a third embodiment of the present invention will be explained. Since the third embodiment is different from the first embodiment and second embodiment in a layer configuration of the ink and a method of forming the ink but the same as them in others, explanations for others except for the method of forming the ink will be omitted.

As shown in FIG. 9, in the present embodiment, the light shielding pattern 6 has a two-layered structure in which the first layer is made of the white ink and the second layer is made of the blue and black mixed ink. The first layer made of the white ink is printed by using a gradation printing plate, and the second layer made of the mixed color ink (blue mixed ink or blue and black mixed ink) is printed by using a solid printing plate.

In the gradation printing plate, the white ink is printed on the optical element 1 so as to make a pattern area smaller as separating further from the LED 2, that is, so as to make a dot density per unit block as shown in FIG. 3 lower. The absorption by the white ink is small as described above. Therefore, by applying this to a wide area, an optimal light shielding performance can be achieved, and a desired luminance uniformity can be achieved.

On the other hand, in the solid printing plate, the blue mixed ink or the blue and black mixed ink is printed only on the hot spot portion right above the LED 2, such as only on the portion of the first pattern 61 of FIG. 2.

At this time, if the sufficient light shielding effect can be achieved by the ink of the first layer printed in the gradation printing plate, there is no problem in the increase in the coating area of the solid printing plate. However, if the sufficient light shielding effect cannot be achieved by the first layer, the increase in the coating area of the second layer by the use of the mixed ink increases the amount of absorption in the second layer for the light transmitted through the first layer.

Therefore, in the present embodiment, in order to cover the wide area on the gradation printing plate, the first layer is formed by printing the first pattern 61 and the second pattern 62 of FIG. 2 by the use of the white ink, and the second layer is formed by printing only the portion right above the LED, that is, only the portion of the first pattern 61 on the solid printing plate by the use of the mixed color ink. That is, in the present embodiment, the first layer formed on the gradation printing plate by using the white ink has both of the first pattern 61 and the second pattern 62, and the second layer formed on the solid printing plate by using the blue mixed ink or the blue and black mixed ink only has the first pattern 61. That is, the first pattern 61 has the multi-layered structure, and the second pattern 62 has the single layer structure. In this manner, the light utilization efficiency and the luminance uniformity can be improved by the first layer, and the reduction in the chromaticity change and the reduction in the light intensity of the hot spot can be achieved by the second layer. Here, the mixed ink is the above-described blue mixed ink or the blue and black mixed ink. However, the mixed ink may be a mixed ink other than this as long as the mixed ink has a higher light absorptivity than that of the ink of the first layer, and as long as the chromaticity change of the mixed ink can be corrected. In the blue and black mixed ink according to the present embodiment, as similar to the second embodiment, note that the mixed ratios of the blue ink and the black ink with respect to the white ink are set in, for example, a range of about 0.1 to 0.4% in weight ratio, respectively.

In this manner, according to the present embodiment, by the two-layered structure, the chromaticity change due to the phosphor of the LED 2 and the white ink in the first layer can be reduced while reducing the light intensity of the hot spot in the vicinity of the portion right above the LED 2. In the present embodiment, the printing process is performed twice. However, the printing process may be performed at the required number of times in order to obtain a required film thickness.

Fourth Embodiment

Figure 10:
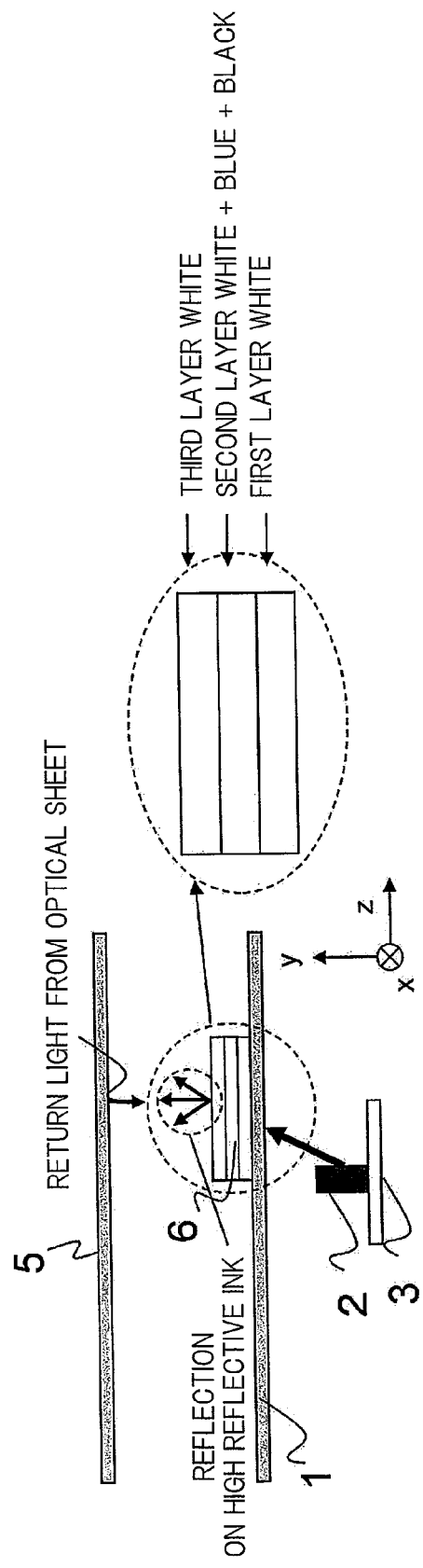
FIG. 10 is a view showing a configuration of an ink 6 according to a fourth embodiment of the present invention.

With reference to FIG. 10, a fourth embodiment of the present invention will be explained. Since the fourth embodiment is different from the above-described embodiments in the layer structure of the ink, but the same as them in others, explanations for others except for the layer structure of the ink will be omitted.

As shown in FIG. 10, in the present embodiment, the first layer of the ink 6 is made of the white ink, the second layer thereof is made of the blue and black mixed ink, and the third layer thereof is made of the white ink. According to the layer structure of such ink 6, light that has been reflected from the optical sheet unit 5 side and returned onto the surface of the ink of the third layer can be reflected on the third layer without being absorbed therein. In this manner, by reflecting the light reflected from the optical sheet unit 5 side and returned thereon by using the high-reflective white ink forming the third layer, the luminance of the emitted light of the lighting device 100 can be improved. Moreover, since the blue and black mixed ink is used for the second layer, the light transmitted through the first layer is favorably absorbed, so that the light intensity of the hot spot can be reduced as similar to the second embodiment. In the blue and black mixed ink according to the present embodiment, the mixed ratios of the blue ink and the black ink with respect to the white ink are set to, for example, about 0.1 to 0.4% in the weight ratio, respectively, as similar to the second and third embodiments. In the case of the fourth embodiment, it is required to form the light shielding pattern (ink 6) so as to have at least the three-layered structure, and therefore, the number of printing process is increased. However, the light utilization efficiency can be enhanced. Moreover, although the blue and black mixed ink is used for the second layer, the blue mixed ink may be used as long as the hot spot can be suppressed by the total film thicknesses of the first to third layers.

Fifth Embodiment

A fifth embodiment of the present invention will be described with reference to FIG. 11. The present embodiment is different from the first to fourth embodiments in the configuration of the optical element (light shielding diffusion plate).

Figure 11:
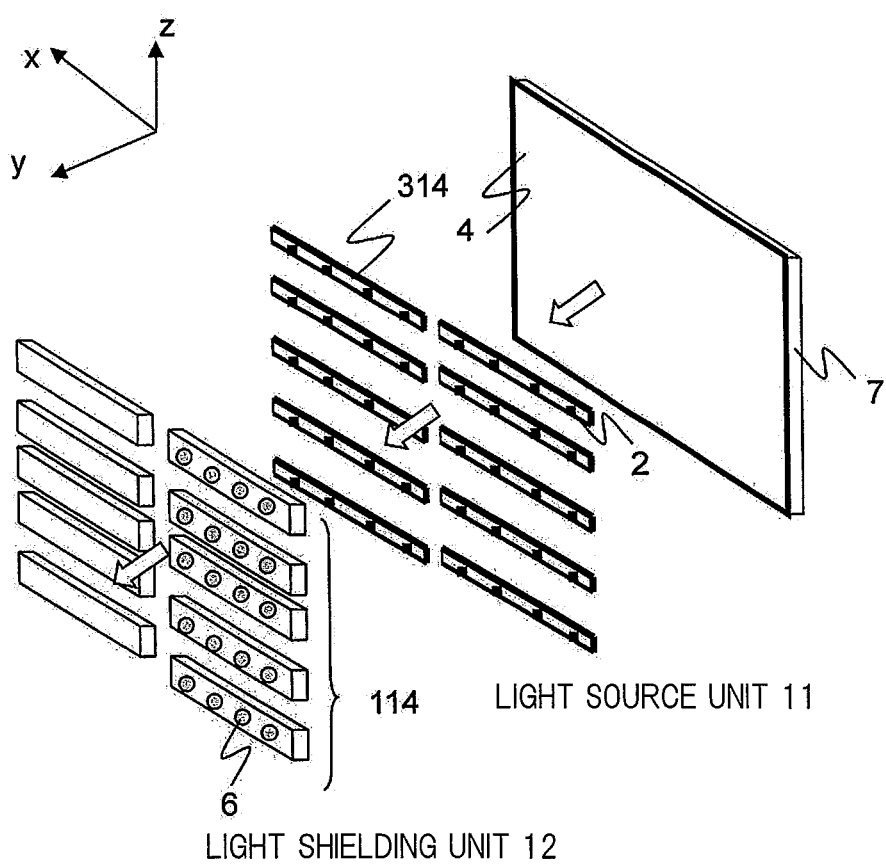
FIG. 11 is an exploded perspective view showing one example of a lighting device according to a fifth embodiment of the present invention.

FIG. 11 is a developed perspective view showing a configuration of a lighting device according to the fifth embodiment, and the illustration of the optical sheet unit 13 is omitted. Moreover, as shown in FIG. 11, in the present embodiment, an LED substrate 314 is divided into two pieces in the x direction, and a light-shielding-unit diffusion plate 114 having a rectangular shape whose longitudinal direction is the x direction is correspondingly provided in each of the divided LED substrates 314. Here, usage of 10 LED substrates 314 and 10 light-shielding-unit diffusion plates 114 is exemplified. That is, in the optical element of the first to fourth embodiments, a size (area) for covering the light emitting surface of the lighting device 100 is configured of one light-shielding-unit diffusion plate 1. However, in the present embodiment, the size is configured of a plurality of light-shielding-unit diffusion plates 114, each of which is smaller than the light-shielding-unit diffusion plate 1 and each of which corresponds to each of the plurality of LED substrates 314. In the present embodiment, each of the light-shielding-unit diffusion plates 114 has a size of about ⅒ of the size of the optical element 1. In FIG. 11, note that the LED substrates 314 are separated from the base chassis 7. However, practically, they are fixed onto the base chassis 7 as similar to the above-described first to fourth embodiments.

By configuring the light-shielding-unit diffusion plates 114 as described in the present embodiment, the deflection of the light-shielding-unit diffusion plates 114 due to heat can be suppressed. Here, such effect will be explained.

As explained above, in the optical element made of resin and arranged in the vicinity of the light source, thermal expansion occurs due to heat generation of the light source, a circuit (driver) for supplying electric power to the light source, and others, so that, for example, such a deflection as to warp so to be convex toward the liquid crystal panel side occurs. By this deflection, the distance between the light source and the optical element is changed depending on a position on the surface of the optical element, and this change appears as the spatial luminance unevenness within the plane. Here, the amount of expansion of an object (amount of extension thereof) "ΔL" is generally expressed by the following Formula 1.

$$\Delta L = \alpha \times L \times \Delta T \quad \text{(Formula 1)}$$

Here, "ΔL" represents the amount of expansion, "α" represents a linear expansion coefficient, "L" represents a length of the object, "ΔT" represents a temperature rising value, and "α" is a physical property value unique to the object. That is, the amount of expansion ΔL becomes larger as the length L of the object becomes larger, and also becomes larger as the temperature rise ΔT on the periphery of the object becomes larger. In the present embodiment, the light-shielding-unit diffusion plate 114 which is smaller than the light-shielding-unit diffusion plate 1 formed in one sheet explained in the first to fourth embodiments is used as the optical element, and therefore, the amount of thermal expansion, that is, a degree of the deflection becomes small, so that the change in the distance between the LED 2 and the light-shielding-unit diffusion plate 114 due to heat can be reduced.

Moreover, by tighten each of the light-shielding-unit diffusion plates 114 together with the base chassis 7 by using a rivet pin or others, the deflection can be further suppressed. The rivet pin may be configured of a screw or others. By using a transparent member or a white member having a high reflective property for the rivet pin or screw, the rivet pin or screw becomes hardly visible as a dark portion, so that the influence on the optical performance of the lighting device caused by such members can be suppressed to the minimum.

In the example shown in FIG. 11, one light-shielding-unit diffusion plate 114 is arranged so as to correspond to one LED substrate 314. That is, since the number of the LED substrates 314 and the number of the light-shielding-unit diffusion plates 114 are the same as each other, the assembly for each substrate becomes easy in a mounting process, so that a degree of freedom in the mounting process is increased. However, the present embodiment is not limited to this. For example, such arrangement that only one LED substrate 314 without being divided corresponds to each LED row, and that two or more of optical elements 114 are arranged so as to correspond to the one LED substrate may be adopted. As the number of divisions of the light-shielding-unit diffusion plate becomes larger, the amount of thermal expansion is smaller, and therefore, this is more effective for the improvement of the luminance unevenness. However, there is concern that the number of mounting processes and the cost are increased by this. Therefore, the number of divisions of the light-shielding-unit diffusion plates can be appropriately determined in consideration of the number of the mounting processes and the cost. Moreover, as the mounting process, for example, a method for successively assembling the reflection sheet 4, the LED substrate 314 and the light shielding diffusion plate 114 to the base chassis 7 may be used, or another method for previously performing the assembly of the LED substrate 314 and the light-shielding-unit diffusion plate 114 to be a module, and then, assembling the reflection sheet 4 to the base chassis 7 so as to be sandwiched by the module and the chassis 7 may be used.

As described above, according to the present embodiment, the deflection due to thermal expansion of the optical element can be prevented, and the luminance unevenness due to the deflection can be reduced.

Sixth Embodiment

A sixth embodiment of the present invention will be explained with reference to FIGS. 12 to 17. The present embodiment is different from the other embodiments in that a prism for use in forming a light propagation groove is provided on the back surface side of the optical element 114 in order to reduce the luminance unevenness. Prior to the explanations for the configuration and optical functions of the present embodiment, a state of the luminance unevenness will be explained with reference to FIG. 15.

Figure 12:
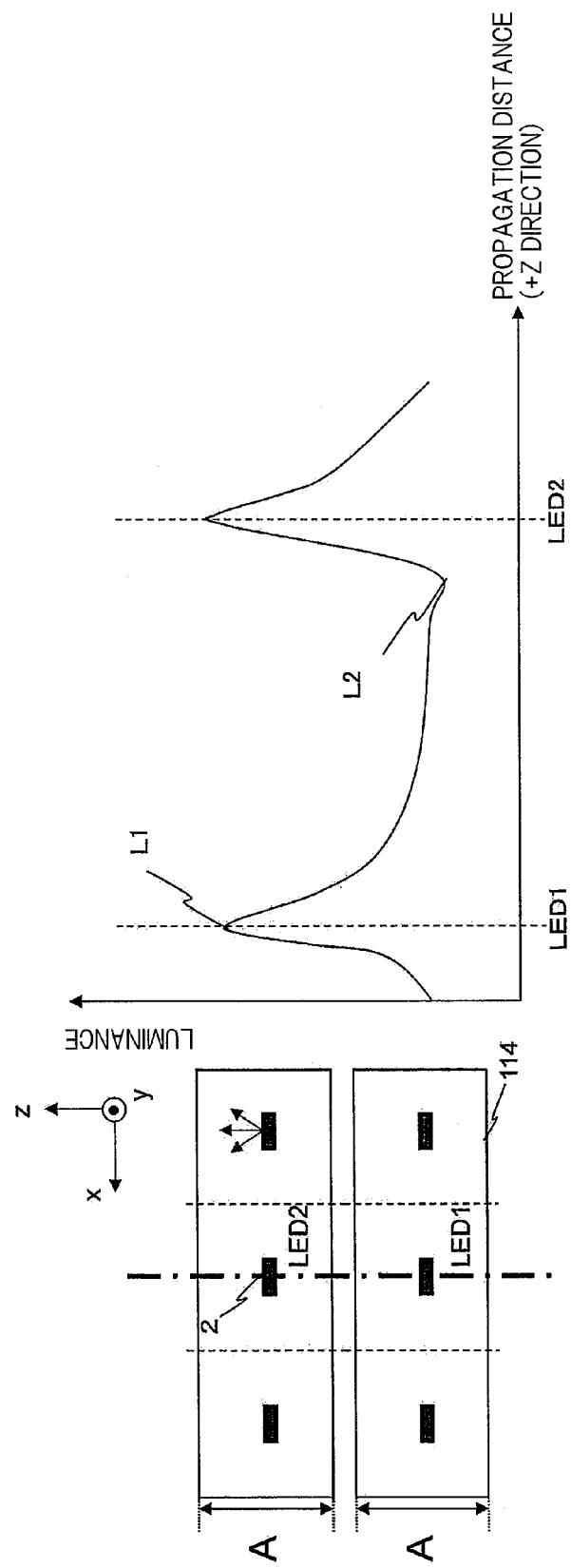
FIG. 12 is a view showing one example of a luminance distribution of a lighting device.

A right-side drawing of FIG. 12 shows a luminance distribution on a dashed line in the light shielding unit shown on the left side. In the right-side drawing of FIG. 12, note that the divided light-shielding-unit diffusion plates 114 of the fifth embodiment are used as the optical element without providing the light shielding patterns (ink 6) of the first to fourth embodiments. Moreover, a dimension (width) of the light-shielding-unit diffusion plate 114 in the z direction is defined as "A" [mm]. The width A is set to be smaller than the array pitch of the LED 2 in the z direction.

As shown in the drawing, the luminance distribution of this example has a peak of luminance L1 on a portion right above each of the arrangement positions of the LED1 and the LED2. Moreover, the luminance in the vicinity of a portion on an opposite side (−z side) to the light emitting direction of the LED becomes the minimum luminance L2. In the shown luminance distribution, the difference between the peak luminance L1 and the minimum luminance L2 is large, and this difference is visually recognized as the luminance unevenness. Although the light-shielding-unit diffusion plate has a diffusing property as described above, it is difficult to reduce the luminance unevenness by using only the diffusing property of the light-shielding-unit diffusion plate.

In order to favorably reduce this luminance unevenness, it is required to decrease the peak luminance L1 but increase the minimum luminance L2. In order to decrease the peak luminance L1, the light shielding pattern (ink 6) as shown in the above-described first to fourth embodiments may be formed at a position corresponding to the portion right above the LED of the light-shielding-unit diffusion plate 114 so that light to be directed to the corresponding position is absorbed by and reflected on the light shielding pattern. On the other hand, in order to increase the minimum luminance L2, it is required to effectively propagate the light reflected on the light shielding pattern 6 or the optical element toward the +z direction.

Figure 13:
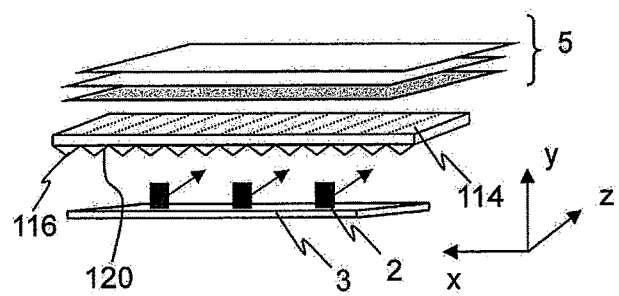
FIG. 13 is a view showing one example of a prism 116 provided in an optical element 114 according to a sixth embodiment of the present invention.
Figure 14:
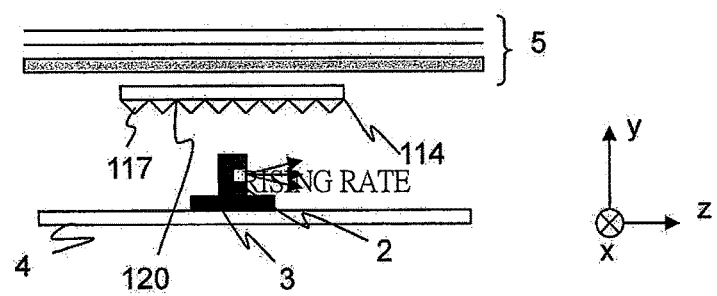
FIG. 14 is a view showing one example of a prism 117 provided in the optical element 114 according to the sixth embodiment of the present invention.

Therefore, in the sixth embodiment, as shown in FIGS. 13 and 14, by providing the prisms 116 and 117 for use in forming a light propagation groove 120 on the back surface side of the light-shielding-unit diffusion plate 114 serving as the optical element, the light reflected on the light shielding pattern can be efficiently guided toward the +z direction. The prism 116 of FIG. 13 has a cross-sectional surface (cross-sectional surface in parallel with the x-y plane) formed in a triangular shape which is orthogonal to the light emitting direction (optical axis) of the LED 2, and is formed so as to extend in the z direction, that is, a direction in parallel with the light emitting direction of the LED 2. A plurality of the prisms 116 are arranged in the x direction. Moreover, the prism 117 of FIG. 14 has a cross-sectional surface (cross-sectional surface in parallel with the y-z plane) formed in a triangular shape which is in parallel with the light emitting direction (optical axis) of the LED 2 and which is also orthogonal to the plane of the light-shielding-unit diffusion plate 114, and is formed so as to extend in the x direction, that is, a direction orthogonal to the light emitting direction of the LED 2. A plurality of the prisms 117 are arranged in the x direction. That is, in the examples of FIG. 13 and FIG. 14, the formation directions of the prisms are orthogonal to each other. In FIG. 13 and FIG. 14, note that the illustration of the ink 6 serving as the light shielding pattern is omitted for simplicity of the illustration.

Figure 15:
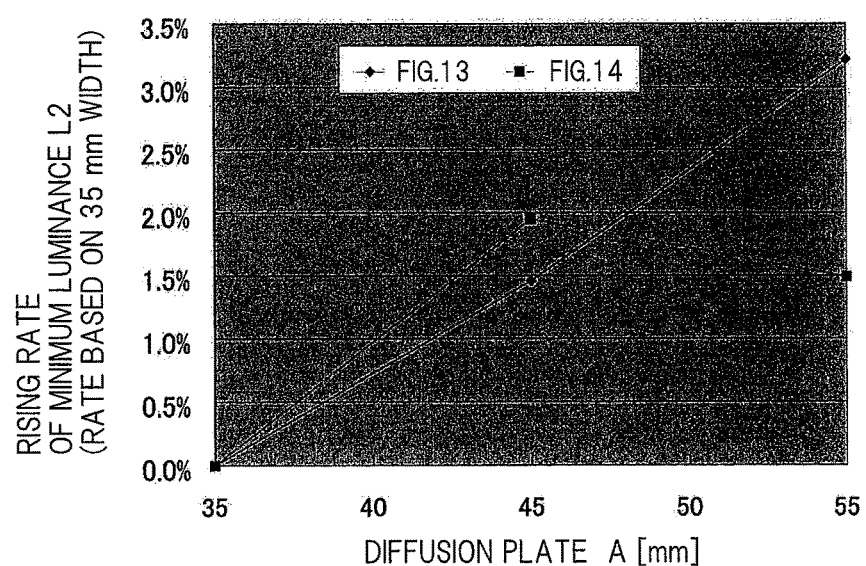
FIG. 15 is a view for explaining effects caused by prisms 116 and 117.

Next, the effects of the prisms 116 and 117 will be explained with reference to FIG. 15. FIG. 15 shows a graph of a rising rate of the minimum luminance with respect to the width A of the light shielding diffusion plate 114 for each of the configurations of FIG. 13 and FIG. 14. In the graph of FIG. 15, a horizontal axis represents the width A [mm] of the light-shielding-unit diffusion plate in the z direction, and a vertical axis represents the rising rate of the minimum luminance L2 with respect to the light-shielding-unit diffusion plate 114 with a width of 35 mm.

As shown in FIG. 15, in the configuration of FIG. 13, as the width of the light-shielding-unit diffusion plate 114 becomes larger, the minimum luminance L2 increases more, and the rising rate becomes about 3.3% at the width of 55 mm. On the other hand, in the configuration of FIG. 14, the luminance raising effect is exerted up to about the width of 45 mm. However, the raising effect of the minimum luminance is saturated at the width of 45 mm or larger. Regarding this phenomenon, the optical function in a direction in parallel with the formation direction (longitudinal direction) of the prism (in FIG. 13) and the optical function in a direction perpendicular to the formation direction (longitudinal direction) of the prism (in FIG. 14) will be explained separately.

First, the optical function in the direction in parallel with the extending direction (longitudinal direction) of the prism will be explained with reference to FIG. 16. FIG. 16(a) shows a state of light in the vicinity of the prism 116 of the light-shielding-unit diffusion plate 114, and FIG. 16(b) shows a state of light on the reflection sheet 4.

Figure 16B:
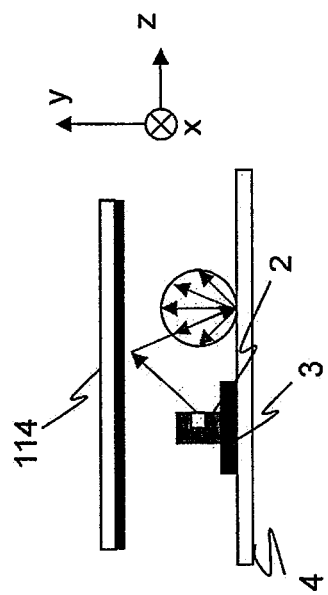
FIGS. 16A and 16B show a view for explaining an optical function in an extending direction of the prism.
Figure 16A:
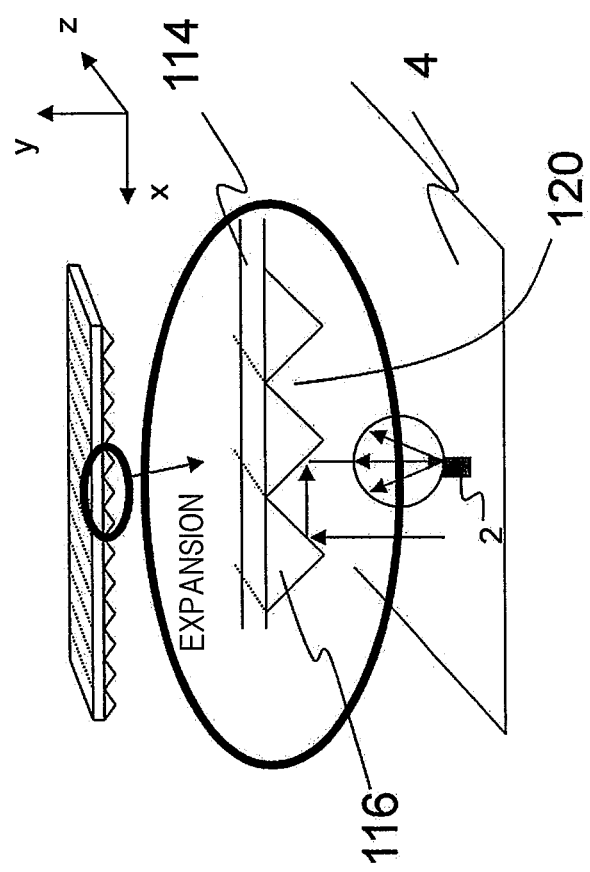

In FIG. 16, light emitted from the LED 2 with a predetermined emitting angle travels in the +z direction, and is allowed to travel in the +z direction while being diffused and reflected between the light-shielding-unit diffusion plate 114 and the reflection sheet 4 or between the optical sheet unit 5 (not shown in the drawing) and the reflection sheet 4. More particularly, light that is made incident perpendicularly to the prism 116 is reflected by the light propagation groove 120 formed between the respective prisms 116 as shown in FIG. 16(a), and is returned to the reflection sheet 4 side. The light returned to the reflection sheet 4 side is diffused and reflected by the reflection sheet 4 as shown in FIG. 16(b), and is traveled in the +z direction. By repeating the phenomena, light is also propagated to a portion separated from the LED 2 in the +z direction, so that the minimum luminance L2 shown in FIG. 12 can be improved. Moreover, since the propagating effect by the light propagation groove 120 becomes larger as the width of the light-shielding-unit diffusion plate 114 becomes wider, the rising rate of the minimum luminance L2 becomes higher as the width of the light-shielding-unit diffusion plate 114 becomes wider. By utilizing such an optical function (light propagation function), the luminance of the minimum luminance L2 can be improved.

Figure 17:
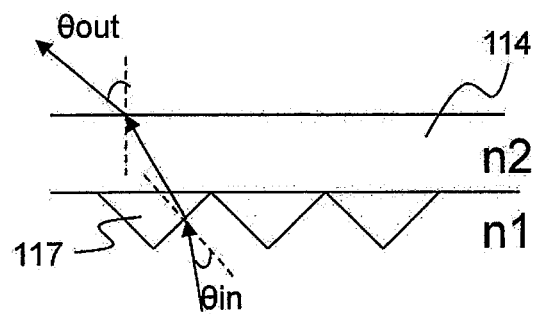
FIG. 17 is a view for explaining an optical function in a direction orthogonal to the extending direction of the prism.

Next, the optical function in a direction perpendicular to the extending direction (longitudinal direction) of the prism will be explained with reference to FIG. 17. FIG. 17 shows a state of light that is diagonally made incident on the prism 117. Here, when it is assumed that the refractive index of the air layer is "n1" and that the refractive index of the light-shielding-unit diffusion plate is "n2" (>n1), light that is made incident on the prism 117 at an incident angle of $\theta_{in}$ is refracted inside the prism 117, and is refracted again when emitted from the light-shielding-unit diffusion plate 114, and then, is emitted out of the light-shielding-unit diffusion plate 114 at an angle of $\theta_{out}$. At this time, since a relation of "$\theta_{in} < \theta_{out}$" is satisfied based upon Snell's law, light is spread in a direction perpendicular to the extending direction (longitudinal direction) of the prism. By utilizing such an optical function, the luminance unevenness in the direction perpendicular to the extending direction (longitudinal direction) of the prism can be reduced.

Figure 18:
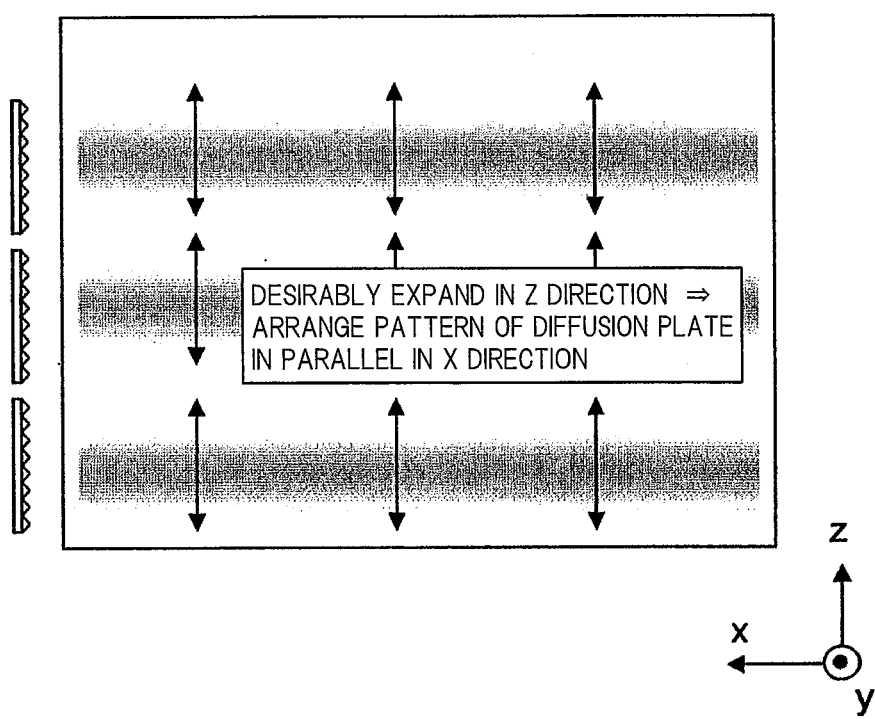
FIG. 18 is a view showing one example of a direction of luminance unevenness and the extending direction of the prism.
Figure 19:
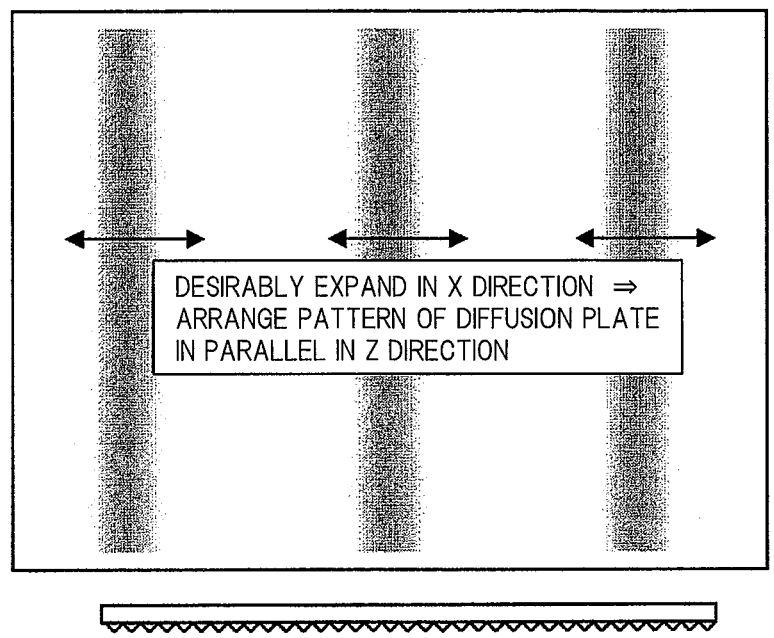
FIG. 19 is a view showing one example of a direction of luminance unevenness and the extending direction of the prism.

With reference to FIG. 18 and FIG. 19, an improving effect of the luminance unevenness will be explained. FIG. 18 shows an example with bright and dark unevenness in parallel with the x direction, and FIG. 19 shows an example with bright and dark unevenness in parallel with the z direction. The light emitting direction of the LED 2 is defined as the +z direction as similar to the above description.

For example, in the example of FIG. 18, the bright and dark unevenness in parallel with the x direction periodically appears in the z direction, and therefore, it is required to spread the light in the z direction. For this reason, in order to reduce the bright and dark unevenness, it is preferred to arrange the orientation of the extending direction (longitudinal direction) of the prism formed on the light-shielding-unit diffusion plate 114 in parallel with the x direction. On the other hand, in the example of FIG. 19, the bright and dark unevenness in parallel with the z direction appears periodically in the x direction, and therefore, it is required to spread the light in the x direction. For this reason, it is preferred to arrange the orientation of the extending direction (longitudinal direction) of the prism formed on the light-shielding-unit diffusion plate 114 in parallel with the z direction. In this manner, by utilizing the effect for spreading the light in the direction perpendicular to the extending direction of the prism, the luminance unevenness can be reduced. Moreover, in the property of the configuration of FIG. 13 as shown in FIG. 15, it has been explained that the rising rate of the minimum luminance L2 is saturated when the width of the light-shielding-unit diffusion plate 114 is 45 mm or larger. This is because the light diffusion effect in the direction perpendicular to the extending direction (longitudinal direction) of the prism is small. That is, the effect for increasing the minimum luminance L2 is exerted by the effect for spreading the light when the width of the light-shielding-unit diffusion plate 114 is 45 mm or smaller. However, when the width is 45 or larger, the effect of transmittance of the light-shielding-unit diffusion plate 114 itself becomes large, and the rising effect of the minimum luminance L2 is saturated.

As described above, the minimum luminance L2 shown in the z direction in FIG. 15 can be increased by using either of the prism 116 extending in the z direction and the prism 116 extending in the x direction. However, it is preferred to use the prism 116 having a higher light propagation effect in the z direction by the use of the light propagation groove 120.

Figure 20:
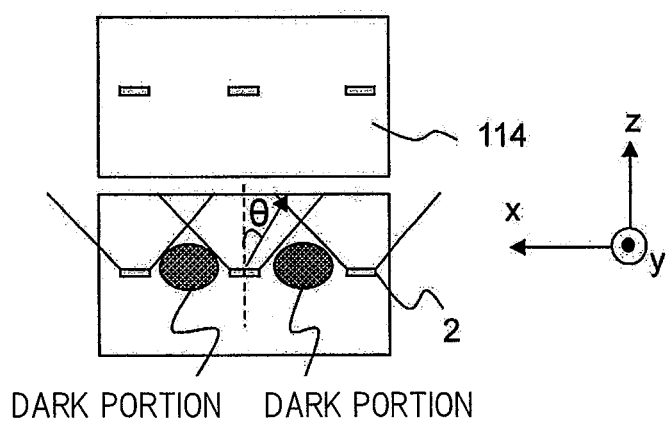
FIG. 20 is a view showing one example of a dark portion generated between LEDs 2.

Moreover, in order to reduce the luminance unevenness by utilizing the diffusion effect of the prism as explained in FIGS. 17 to 19, it is required to set the orientation of the prism extending direction (longitudinal direction) to be in parallel with the direction of the luminance unevenness to be reduced. The optimal orientation of this prism can be determined by an array pitch in the horizontal direction (x direction) of the LED 2 and/or an array pitch in the perpendicular direction (z direction) thereof. Generally, the light intensity of the LED is the strongest in the light on the optical axis of the LED (light at a light emitting angle of 0 degree), and is the weakest in the light in a direction of ±90 degrees from the optical axis. For this reason, when the array pitch in the horizontal direction (x direction) of the LED 2 is wide, the dark portion is generated between the LEDs 2 as shown in, for example, FIG. 20, and the periodic bright and dark unevenness occurs along the horizontal direction (x direction). In this case, the prism 116 whose extending direction is in parallel with the z direction is used. On the other hand, when the array pitch in the perpendicular direction of the LED 2 is wide, the bright and dark unevenness periodically occurs in parallel with the x direction and along the z direction, and therefore, the prism 117 whose extending direction is in parallel with the z direction is used. In this manner, it can be determined to use either the prism 116 or 117 (that is, the extending direction of the prism) depending on the size of the array pitches in the horizontal direction and the perpendicular direction of the LED 2. Moreover, it can be determined which prism is used depending on the configuration of the optical sheet. For example, it can be determined which prism is used depending on the direction of luminance unevenness to be reduced by the optical sheet.

Moreover, the light emitting surface (surface on the optical sheet side) of the light-shielding-unit diffusion plate 114 may be formed as a crimped surface (shibo surface in Japanese) (mat surface) or a glossy surface. While the crimped surface is effective to reduce the luminance unevenness because the diffusion effect of light is increased, the glossy surface contributes to improve the luminance because the light propagation effect between the optical sheet 5 and the light-shielding-unit diffusion plate 114 becomes large.

Figure 21:
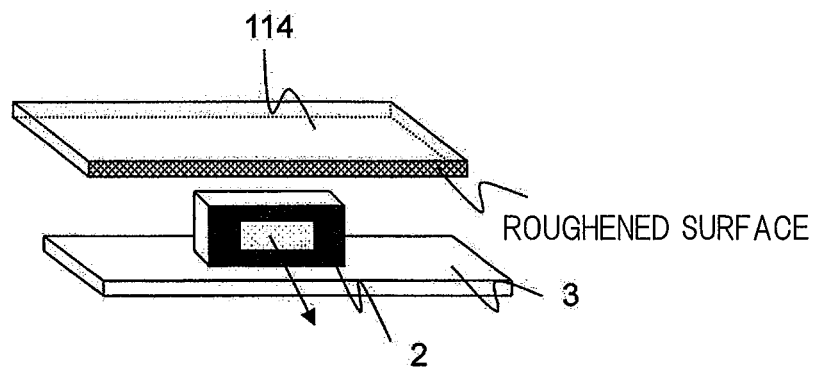
FIG. 21 is a view showing an example in which an end surface of a light-shielding-unit diffusion plate 114 is subjected to a surface roughening treatment.
Figure 22:
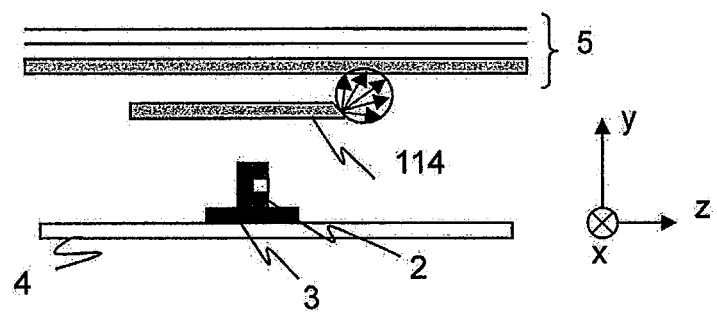
FIG. 22 is a view showing an example in which a taper surface is provided to an end portion of the light-shielding-unit diffusion plate 114.

Moreover, as shown in, for example, FIG. 21, an end surface in the +z direction (light emitting side of the LED) of the light-shielding-unit diffusion plate 114 may be formed as a roughened surface. By forming the end surface as the roughened surface, light propagated through inside of the light-shielding-unit diffusion plate 114 is impacted on the roughened surface formed on the end surface, and is scattered, so that the luminance in the vicinity of the end surface can be improved. Such a roughened end surface may be formed by using a sandblasting method, or may be previously formed on a mold for use in molding the light-shielding-unit diffusion plate 114. Moreover, by forming the end surface as a mirror surface, the light propagated through the inside of the light-shielding-unit diffusion plate 114 can reach the minimum luminance portion, so that the same effect as that of the roughened surface can be obtained. Furthermore, as shown in FIG. 22, on the end portion in the +z direction of the light-shielding-unit diffusion plate 114, a taper surface directed to the optical sheet 5 side may be formed. In this manner, the light propagated through the inside of the light-shielding-unit diffusion plate 114 and light transmitted from a front row (+z direction side) are diffused by the taper surface, so that the light is guided so as to reach a farther direction. Moreover, by changing a taper angle, the effect of the increase in the luminance at a desired position is obtained. This taper angle may be appropriately changed by the pitch of the LED 2 or others.

In the sixth embodiment, note that the light-shielding-unit diffusion plate 114 of the fifth embodiment divided into the plurality of pieces is used as the optical element. However, the light-shielding-unit diffusion plate 1 configured of one plate as explained in the first embodiment or others may also be used.

As described above, according to the present embodiment, the spatial color unevenness and luminance unevenness on the light-emitting surface of the lighting device can be reduced. Moreover, the luminance unevenness caused by thermal expansion can also be reduced.

In the above-described embodiment, note that the prisms 116 and 117 are provided on the surface (light incident surface of the light-shielding-unit diffusion plate 114) on the LED 2 side of the light-shielding-unit diffusion plate 114. However, the provision is not limited to this surface. They may be provided on the light emitting surface of the light-shielding-unit diffusion plate 114 or on both of the light incident surface and light emitting surface thereof. Moreover, the present embodiment exemplifies the example of the cross-sectional surface of the light propagation groove 120 as the triangular shape. However, the shape is not limited to this. For example, the groove may be a lenticular groove whose cross-section shape is a semi-circular shape, a trapezoidal groove whose cross-section shape is a trapezoidal shape, or a rectangular groove whose cross-section shape is a square shape, or may be a groove whose cross-section shape has multiple steps. The cross-sectional surface may have any shape as long as a light propagation function as shown in FIG. 16(a) is exerted by the refraction or reflection.

Seventh Embodiment

Figure 23B:
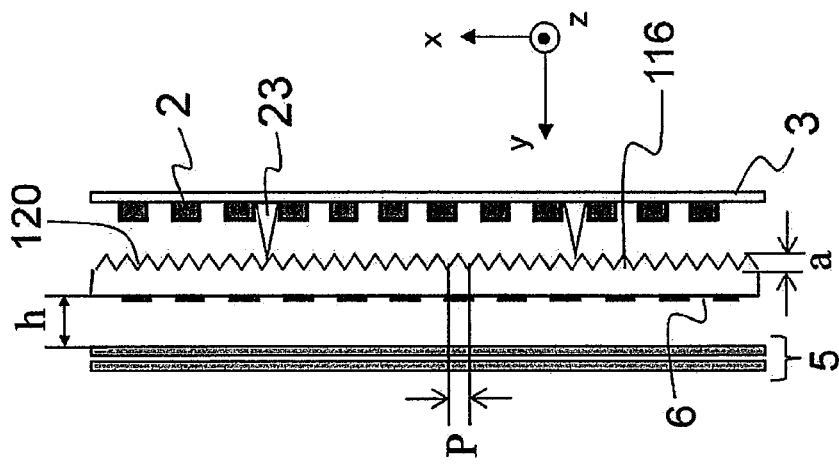
FIGS. 23A and 23B show a view showing one example of a lighting device according to a seventh embodiment of the present invention.
Figure 23A:
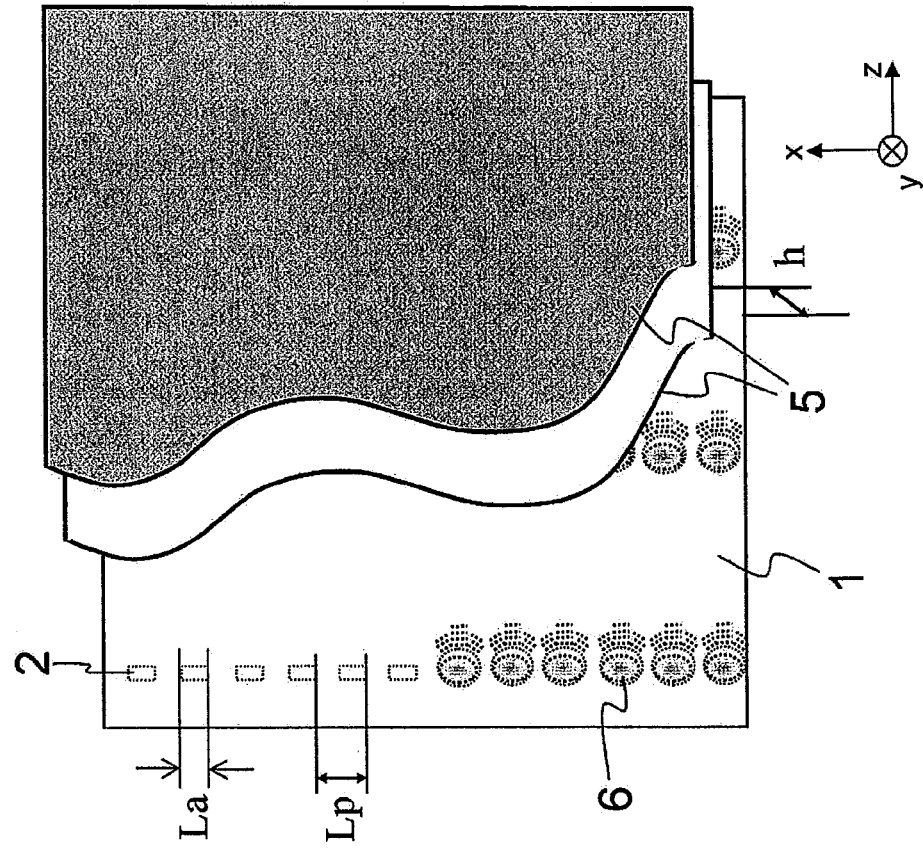

With reference to FIG. 23, one example of an array pitch and a height of the above-described light propagation groove 120 will be explained as a seventh embodiment of the present invention. FIG. 23(a) is a partially-enlarged view of a lighting device according to the present embodiment when seen from the light emitting surface side (+y direction side), and FIG. 24(b) is its cross-sectional view (cross-sectional view of the x-y plane). In this example, note that the prism 116 extending in the light emitting direction (z direction) of the LED is used as the prism. Moreover, the light-shielding-unit diffusion plate 1 configured of one plate is used as the optical element. However, the divided light-shielding-unit diffusion plates 114 may be used. Furthermore, the light-shielding-unit diffusion plate 1 is supposed from the back surface side itself by using, for example, a conical pin 23. The present drawing does not show the light shielding pattern 6 on the portion right above all the LEDs 2, this illustration is partially omitted.

Figure 25:
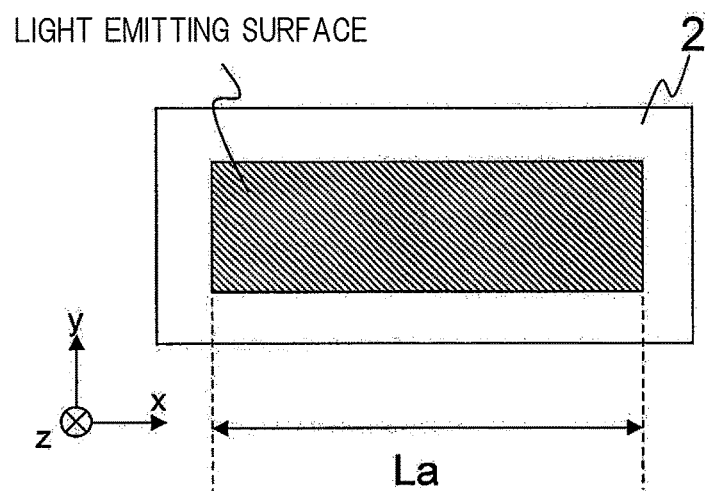
FIG. 25 is a view showing one example of a lighting device according to an eighth embodiment of the present invention.

In FIG. 23, when it is assumed that an array pitch in the x direction (direction orthogonal to the light emitting direction of the LED) of the light propagation groove 120 or the prism 116 for use in forming the light propagation groove is "P", that a width in the longitudinal direction of the light emitting surface of the LED 2 is "La", that an array pitch in the x direction of the LED 2 is "Lp", and that the number of the light propagation grooves 120 within the width La is "Na", the present embodiment is designed so as to satisfy the following Formula 2. Note that the width La of the light emitting surface of the LED 2 is more specifically defined as shown in FIG. 25.

$$Lp/P \geq Na \geq Lp/La \text{ (in this case, } Lp > La \text{ and } Lp > P\text{)} \quad \text{(Formula 2)}$$

Here, the array pitch P in the x direction of the light propagation groove 120 is set to, for example, 30 to 70 mm, the width La in the longitudinal direction of the light emitting surface of the LED 2 is set to, for example, 3 mm, and the array pitch P in the x direction of the light propagation groove 120 is set to, for example, about 0.01 to 0.05 mm. In this manner, the array pitch P of the grooves is set so as to make the number Na of the light propagation grooves 120 within the width La smaller than the total number of the light propagation grooves 120 with the array pitch Lp of the LED 2.

When the above-described Formula 2 is satisfied, the light propagation grooves 120 by the number of which the width La of the light emitting surface of the LED 2 can be divided into a plurality of portions can be arranged even if the array pitch Lp of the LED 2 is large. In this manner, the hot spot on the portion right above the LED 2 is diffused or scattered by the light propagation grooves 120, so that the light intensity of the hot spot is reduced, and the luminance uniformity can be improved. Moreover, as described above, since light that forms the hot spot is propagated in the +z direction by the light propagation grooves 120, the luminance uniformity in the z direction can be also improved.

Moreover, in FIG. 23, when it is assumed that the height in the y direction (direction orthogonal to the surface of the light-shielding-unit diffusion plate 1) of the prism 116 forming the light propagation grooves 120 is "a", and that the distance (diffusion distance) between the light emitting surface of the light-shielding-unit diffusion plate 1 and the light incident surface of the optical sheet 5 (if a plurality of optical sheets 5 are provided, the incident surface of the optical sheet closest to the light-shielding-unit diffusion plate 1) is "h", the present embodiment is configured so as to satisfy the following Formula 3.

$$h \geq a \quad \text{(Formula 3)}$$

Here, the height "a" of the prism 116 is, for example, 0.05 to 0.5 mm, and the diffusion distance h is, for example, about 0.5 to 10 mm.

If the diffusion distance "h" is set to be the height "a" of the prism 161 or larger, light which is reflected or refracted by the light propagation groove 120 formed by the prism 161 and which is propagated through the light shielding diffusion plate 1 while traveling in the +z direction, and then, is emitted, can be favorably diffused by a space defined by the diffusion distance "h" (space between the light-shielding-unit diffusion plate 1 and the optical sheet 5). Moreover, light which is reflected on the optical sheet 5 and made incident on the light shielding diffusion plate 1, and then, is reflected on the light-shielding-unit diffusion plate 1 or emitted from the light shielding diffusion plate 1 can also be favorably diffused by the space defined by the diffusion distance "h". Therefore, according to such a configuration, the luminance distribution from the light-shielding-unit diffusion plate 1 to the light emitting surface can be uniformed or smoothened, so that, for example, the hot spot right above the LED 2 can be reduced. Moreover, the bright and dark unevenness (having a tendency of further appearing as the height of the prism becomes higher) which is similar to the array shape of the prism and which has a possibility of generation by the provision of the prism 161 can also be favorably diffused by the space defined by the above-described diffusion distance "h" so as to be unnoticeable.

Eighth Embodiment

Figure 24:
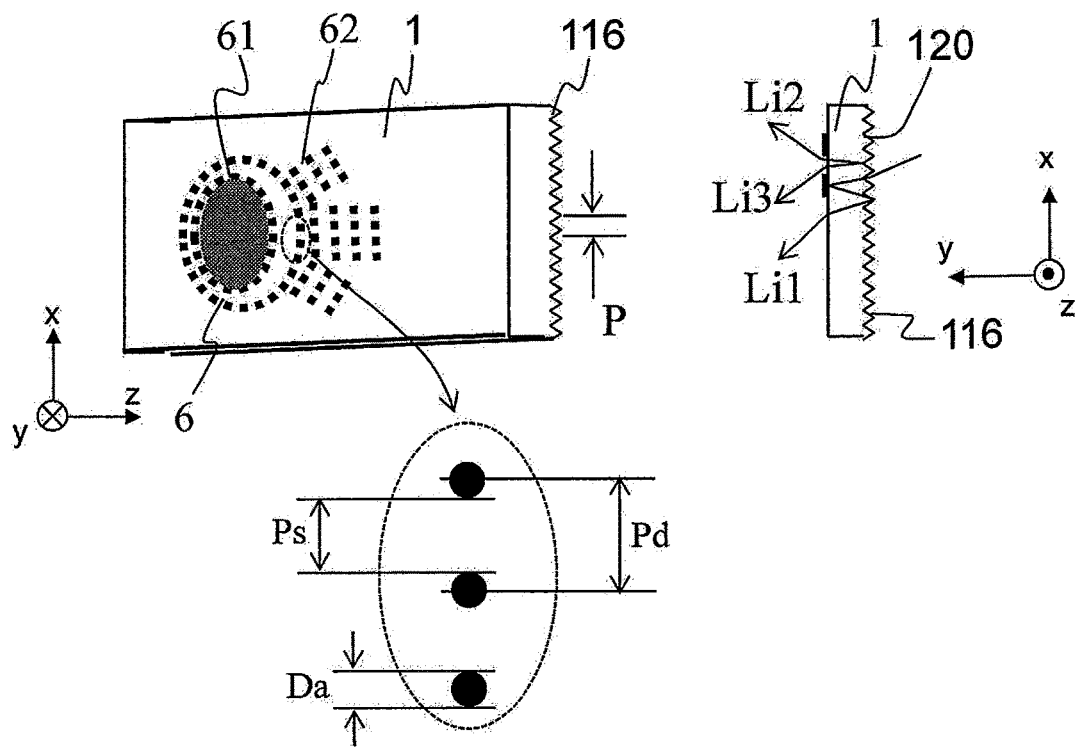
FIG. 24 is a view showing one example of a light emitting surface of an LED.

With reference to FIG. 24, still another example of the array pitch of the above-described light propagation groove 120 will be explained as an eighth embodiment of the present invention. A drawing on the left side of FIG. 24 shows a partially-enlarged view centering one light shielding pattern 6 that is obtained when the lighting device according to the present embodiment is seen from the light emitting surface side (+y direction side), a drawing on the right side thereof shows a cross-sectional view (cross-sectional view of the x-y plate) thereof, and a drawing on the lower side thereof shows a partially-enlarged view of a dot in the light shielding pattern 6. In this example, note that a prism 116 extending in the light emitting direction (z direction) of the LED is used as the prism. Moreover, the light-shielding-unit diffusion plate 1 configured of one plate is used as the optical element. However, the divided light-shielding-unit diffusion plate 114 may be used.

In FIG. 24, when it is assumed that an array pitch in the x direction of the light propagation groove 120 (direction orthogonal to the light emitting direction of the LED) is "P", and that the minimum dot size in a second pattern 62 of the light shielding pattern 6 is "Da", the present embodiment is configured so as to satisfy the following Formula 4.

$$3 \times Da > P \geq Da/100 \quad \text{(Formula 4)}$$

In satisfaction of this condition, when dots of the light shielding pattern 6 are continuously arranged, for example, if the space between dots is smaller than the distance of the three dots, at least one prism 116 or more are arranged in the space. For this reason, as shown in FIG. 24, rays of the light are split to be scattered (see Li2 and Li3 in the drawing) between the dots of the light shielding pattern 6 by the two surfaces of the prism 116. Moreover, the light reflected by the dots of the light shielding pattern 6 is reflected by the surface of the prism 116, and then, is again emitted (see Li1 in the drawing). Since these rays of the light are emitted while travelling so as to cover upper portions of the dots, it is difficult to view shade caused by the dots when seen from the light emitting surface side of the lighting device. Of course, when the prism pitch is small, the above-described light can be finely scattered. However, in the current printing machine, the minimum printed dot diameter is about 0.2 mm to 0.5 mm, or about 1 mm at the minimum, and therefore, a scattering width of the light is narrowed when the prism is made too small, and the effect (of preventing the visible shade caused by the dots) by the scattering is reduced. Moreover, it is also difficult to form the prism (light propagation groove). Therefore, in order to obtain the above-described effect and in the viewpoint of the formation of the prism, the lower limit value of the parallel-arranged pitch "P" of the prism 116 is preferably set to about 0.01 mm.

Moreover, in FIG. 24, supposing that the array pitch in the x direction (direction orthogonal to the light emitting direction of the LED) of the light propagation groove 120 or the prism 116 for use in forming the light propagation groove is "P", that the minimum pitch of the dots in the light shielding pattern 6 is "Pd", and that the minimum space distance between the dots is "Ps", the present embodiment is configured so as to satisfy the following Formula 5 when the transmittance Tr of the light shielding pattern 6 is set in a range of "0.1%≤Tr<50%".

$$Pd \geq P \geq Ps \qquad \text{(Formula 5)}$$

If the condition of the above-described Formula 5 is satisfied, such light as to form shade of an outline of the dots can be scattered by the reflection or refraction function of the two prism surfaces of the prism 116 since the array pitch P of the prism 116 is made smaller than the minimum pitch of the dots, so that the scattering can make it difficult to view the shade of the dots. When the light is leaked from the minimum space between the dots in the light shielding pattern 6, the light leaked from the space can be covered with the shade of each dot adjacent to the space by making the array pitch P of the prism 116 to be larger than the minimum space distance, and therefore, the luminance uniformity can be further improved.

Ninth Embodiment

Figure 26:
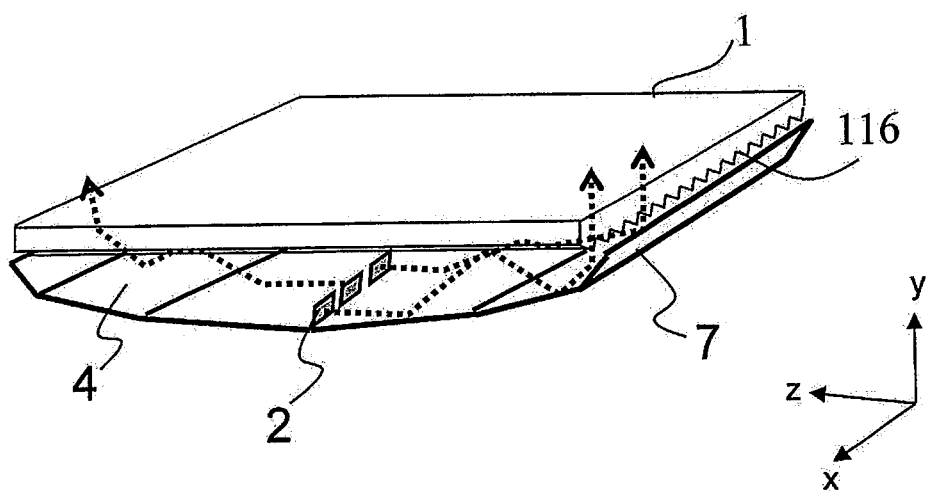
FIG. 26 is a view showing one example of a lighting device according to a ninth embodiment of the present invention.

With reference to FIG. 26, a ninth embodiment of the present invention will be explained. In the embodiments explained above, all the light emitting directions of the LEDs 2 arranged in one row are set to the same direction (to the +z direction) as each other. However, in the present embodiment, the light emitting directions are reversed (to the −z direction) alternately every each LED. That is, in the present embodiment, the LED 2 that emits the light in the +z direction and the LED 2 that emits the light in the −z direction are alternately arranged along the x direction. Here, the light emitting directions of the LEDs 2 are set to the +z direction and −z direction. However, the directions may be set to the +x direction and −x direction.

The reflection sheet 4 is provided on the inner surface of the chassis 7, and the reflection sheet has such a slope as tilting further toward the light emitting direction (on a drawing sheet) of the lighting device as it becomes closer to the periphery of the lighting device as shown in the drawing. Therefore, the light emitted from the LED 2 is reflected by the slope of the reflection sheet 4, and is propagated in the direction of the light propagation groove of the light-shielding-unit diffusion plate 1, and then, passes through the light-shielding-unit diffusion plate 1 when the incident angle is appropriate, and is emitted from the light emitting surface. In this manner, the light can be propagated toward the periphery of the lighting device, so that the luminance of not only the center portion but also the tip portion can be improved.

In this manner, by using the small number of the LEDs, the light can be supplied over the entire light emitting surface of the lighting device while improving the luminance uniformity.

In the above-described first to ninth embodiments, as the light-shielding-unit diffusion plate 1 configured of one plate, only one plate is used. However, for example, two plates of the light-shielding-unit diffusion plate 1 can be arranged so as to be overlapped with each other in the +y direction. In this case, the surface on which the prism is formed is preferably provided on the light-incident side in the light-shielding-unit diffusion plate 1 on the lower side (back-surface side of the lighting device), and is preferably provided on the light emitting side in the light-shielding-unit diffusion plate 1 on the upper side (light-emitting side of the lighting device). However, the surface may be provided on the light-incident sides in both of them, or the light-emitting sides in both of them.

Note that the example of application of the lighting device to a backlight of a video display device (liquid crystal display device) has been explained in each embodiment described above. However, the application is not limited to this. The lighting device according to the present embodiments can be applied as, for example, room righting, or on-vehicle or elevator righting, and also as lighting for a signboard.

SYMBOL EXPLANATION

1 . . . optical element, 2 . . . LED, 3 . . . LED substrate, 4 . . . reflation sheet, 5 . . . optical sheet, 6 . . . light shielding patter (ink), 7 . . . base chassis, 9 . . . light shielding layer, 10 . . . liquid crystal panel, 61 . . . first pattern, 62 . . . second pattern

The invention claimed is:

1. A lighting device for emitting light comprising:
   a base chassis;
   a reflection sheet provided on the base chassis;
   an optical element arranged at a predetermined distant position away from the reflection sheet in a direction in orthogonal to a light emitting surface of the lighting device;
   a plurality of LEDs arranged in one row in a space between the reflection sheet and the optical element so as to emit light in a direction in parallel with the light emitting surface of the lighting device; and
   an optical sheet provided on the light emitting surface side of the optical element,
   wherein a light shielding pattern is provided at a position corresponding to each of the LEDs on the light emitting surface side of the optical element, and
   the light shielding pattern is configured by stacking a plurality of light shielding layers in which a light shielding layer positioned closest to the optical element side among the light shielding layers has a ratio of white color higher than a ratio of white color of at least one of the other light shielding layers.

2. The lighting device according to claim 1,
   wherein the LED contains a phosphor, and has a configuration for emitting white light by excitation of the phosphor.

3. The lighting device according to claim 1,
   wherein the light shielding layer positioned closest to the optical element side among the plurality of light shielding layers is made of a white ink, and at least one of the other light shielding layers is made of a mixed color ink of white and blue, or a mixed color ink of white, blue and black.

4. The lighting device according to claim 1,
   wherein the light shielding pattern includes at least three light shielding layers, and, when it is assumed that the three light shielding layers are defined as a first layer, a second layer and a third layer sequentially from the optical element side toward the optical sheet side, the first layer is made of a white ink, and either one of the second layer and the third layer is made of a white ink, and the other one is made of a mixed ink of white and blue, or a mixed ink of white, blue and black.

5. The lighting device according to claim 1,
wherein the light shielding pattern includes at least two light shielding layers, and one light shielding layer positioned closest to the optical element among the two layers is made of a white ink, and the other light shielding layer is made of a mixed color ink of white and blue, or a mixed color ink of white, blue and black.

6. The lighting device according to claim 5,
wherein the light shielding pattern includes: a first pattern having an oval or elliptical shape provided correspondingly right above the LED; and a second pattern configured of a plurality of dots provided on periphery of the first pattern and configured so that a density of the dots per a unit area is lower as being distant away farther from the first pattern, and
one light shielding layer made of the white ink and positioned closest to the optical element includes the first pattern and the second pattern, and the other light shielding layer made of the mixed ink includes the first pattern.

7. The lighting device according to claim 1,
wherein the optical element is a diffusion plate.

8. The lighting device according to claim 7, further comprising:
an LED substrate on which the plurality of LEDs arranged in one row are mounted, a plurality of the LED substrates being arranged along a light emitting direction of the LED,
wherein one or a plurality of the diffusion plates are provided so as to correspond to the LED substrates, respectively.

9. The lighting device according to claim 8,
wherein a plurality of prisms are formed on a surface on the LED side of each of the diffusion plates.

10. The lighting device according to claim 9,
wherein each of the prisms has a triangular-shaped cross-sectional surface in orthogonal to the light emitting direction of the LED and is formed so as to extend in the light emitting direction of the LED, or has a triangular-shaped cross-sectional surface in parallel with the light emitting direction of the LED and also orthogonal to a surface of the optical element and is formed so as to extend in a direction orthogonal to the light emitting direction of the LED.

11. The lighting device according to claim 9,
wherein a roughened surface, a mirror surface or a taper surface is formed on an end surface or an end portion of the diffusion plate on the light emitting direction side of the LED.

12. The lighting device according to claim 9,
wherein a surface of the diffusion plate on which the prism is not formed is an crimped surface or a glossy surface.

13. A video display device using the lighting device according to claim 1 as a backlight,
wherein light from the backlight is emitted to a liquid crystal panel so as to display video images.

14. A lighting device for emitting light comprising:
a base chassis;
a reflection sheet provided on the base chassis;
an optical element arranged at a predetermined distant position away from the reflection sheet in a direction in orthogonal to a light emitting surface of the lighting device;
a plurality of LEDs arranged in one row in a space between the reflection sheet and the optical element so as to emit light in a direction in parallel with the light emitting surface of the lighting device;
an optical sheet provided on the light emitting surface side of the optical element; and
an LED substrate on which the plurality of LEDs arranged in one row are mounted,
wherein a light shielding pattern is provided at a position corresponding to each of the LEDs on one surface of the diffusion plate, and a light propagation groove extending in a direction in parallel with a light emitting direction of the LED is formed on the other surface thereof,
wherein the one surface of the diffusion plate is the light emitting surface of the diffusion plate, the other surface thereof is a light incident surface of the diffusion plate, the light shielding pattern is provided on the light emitting surface of the diffusion plate, and a prism for use in forming the light propagation groove is provided on the light incident surface of the diffusion plate.

15. The lighting device according to claim 14,
wherein, when it is assumed that an array pitch of the light propagation groove in a direction orthogonal to a light emitting direction of the LED is P, that a width in a longitudinal direction of the light emitting surface of the LED is La, that an array pitch of the LED is Lp, and that the number of the light propagation grooves within the width La is Na, a relation of "Lp/P≥Na≥Lp/La (note that Lp>La and Lp>P)" is satisfied.

16. The lighting device according to claim 14,
wherein, when it is assumed that a height of the prism is a, and that a distance between the light emitting surface of the diffusion plate and the incident surface of the optical sheet is h, a relation of "h≥a" is satisfied.

17. The lighting device according to claim 14,
wherein the light shielding pattern includes a plurality of dots, and, when it is assumed that an array pitch of the light propagation groove in a direction orthogonal to the light emitting direction of the LED is P, and that the minimum size of the dots of the light shielding pattern is Da, a relation of "3×Da>P≥Da/100" is satisfied.

18. The lighting device according to claim 14,
wherein the light shielding pattern includes a plurality of dots, and, when it is assumed that an array pitch of the light propagation groove in a direction orthogonal to a light emitting direction of the LED is P, that the minimum pitch of the dots of the light shielding pattern is Pd, and that the minimum space distance between the dots of the light shielding pattern is Ps, in a case of a transmittance Tr of the light shielding pattern in a range of 0.1%≤Tr<50%, a relation of "Pd≥P≥Ps" is satisfied.

19. The lighting device according to claim 14,
wherein two LEDs having different light emitting directions from each other are alternately arranged in one row, and the reflection sheet is provided with such a slope as tilting in the light emitting direction of the lighting device.

* * * * *